US012124181B2

(12) United States Patent
Kinai

(10) Patent No.: US 12,124,181 B2
(45) Date of Patent: Oct. 22, 2024

(54) IMAGE FORMING APPARATUS INCLUDING DISCHARGE MEMBER THAT SUPPLY DISCHARGE CURRENT TO INTERMEDIATE TRANSFER BELT ONTO WHICH TONER IMAGE IS TRNASFERRED

(71) Applicant: CANON KABUSHIKI KAISHA, Tokyo (JP)

(72) Inventor: Keisuke Kinai, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/339,008

(22) Filed: Jun. 21, 2023

(65) Prior Publication Data

US 2023/0418178 A1 Dec. 28, 2023

(30) Foreign Application Priority Data

Jun. 24, 2022 (JP) ................................ 2022-102273

(51) Int. Cl.
*G03G 15/00* (2006.01)
*G03G 15/01* (2006.01)
(Continued)

(52) U.S. Cl.
CPC ..... *G03G 15/0189* (2013.01); *G03G 15/0266* (2013.01); *G03G 15/161* (2013.01); *G03G 15/50* (2013.01); *G03G 21/0047* (2013.01)

(58) Field of Classification Search
CPC ........... G03G 15/0189; G03G 15/0266; G03G 15/161; G03G 15/1675; G03G 15/50; G03G 21/0047
See application file for complete search history.

(56) References Cited

U.S. PATENT DOCUMENTS

2011/0076041 A1 3/2011 Hyakutake
2014/0105626 A1* 4/2014 Ohno ................ G03G 15/1605 399/101
(Continued)

FOREIGN PATENT DOCUMENTS

JP 2006047491 A 2/2006
JP 2013231960 A 11/2013
(Continued)

*Primary Examiner* — Sophia S Chen
(74) *Attorney, Agent, or Firm* — Canon U.S.A., Inc. IP Division

(57) ABSTRACT

An image forming apparatus includes an image bearing member, an intermediate transfer belt, first, second, and third power sources, and a control unit. During print job execution, the control unit controls the third power source such that a discharge current supplied to the intermediate transfer belt is constant current controlled based on first and second power source current supply detection results. When changing from a first to a second discharge current, the control unit controls the third power source such that, after a first image forming region passes through a primary transfer portion, an intermediate transfer belt trailing edge to which the first discharge current is supplied initially passes through the primary transfer portion and such that, before a second image forming region passes through the primary transfer portion, an intermediate transfer belt leading edge to which the second discharge current is supplied initially passes through the primary transfer portion.

8 Claims, 15 Drawing Sheets

(51) Int. Cl.

| | |
|---|---|
| ***G03G 15/02*** | (2006.01) |
| ***G03G 15/16*** | (2006.01) |
| ***G03G 21/00*** | (2006.01) |

(56) References Cited

U.S. PATENT DOCUMENTS

| | | | | |
|---|---|---|---|---|
| 2016/0334738 | A1 | 11/2016 | Kochi | |
| 2018/0246451 | A1 | 8/2018 | Ito | |
| 2019/0041775 | A1* | 2/2019 | Hirado | G03G 15/161 |
| 2020/0073291 | A1* | 3/2020 | Takeuchi | G03G 15/161 |

FOREIGN PATENT DOCUMENTS

| | | | |
|---|---|---|---|
| JP | 2018128613 | A | 8/2018 |
| JP | 2018141855 | A | 9/2018 |
| JP | 2019200282 | A | 11/2019 |
| JP | 2020034699 | A | 3/2020 |

* cited by examiner

IMAGE FORMING APPARATUS INCLUDING DISCHARGE MEMBER THAT SUPPLY DISCHARGE CURRENT TO INTERMEDIATE TRANSFER BELT ONTO WHICH TONER IMAGE IS TRNASFERRED

BACKGROUND

Field

The present disclosure relates to an image forming apparatus such as a copying machine, a printer, or a facsimile machine using an electrophotographic system or an electrostatic recording system.

Description of the Related Art

In the related art, as an image forming apparatus using an electrophotographic system or the like, there is an image forming apparatus employing an intermediate transfer system in which toner images formed on a plurality of image bearing members are primarily transferred onto an intermediate transfer member and then secondarily transferred onto a recording material such as paper. As the intermediate transfer member, an intermediate transfer belt formed of an endless belt (hereinafter, also simply referred to as "belt") is widely used. In an example, Japanese Patent Laid-Open No. 2020-034699 discloses a discharge device having a discharge member that abuts against the intermediate transfer belt to receive ions from the intermediate transfer belt.

The primary transfer is often performed by applying a primary transfer voltage to a primary transfer member provided to be contactable with the inner peripheral surface of the intermediate transfer belt in correspondence with each of the plurality of image bearing members and supplying a primary transfer current to a primary transfer portion where the image bearing member and the intermediate transfer belt abut against each other. The secondary transfer is often performed by applying a secondary transfer voltage to a secondary transfer member provided to be contactable with the outer peripheral surface of the intermediate transfer belt and supplying a secondary transfer current to a secondary transfer portion where the intermediate transfer belt and the secondary transfer member abut against each other.

Deposits such as toner (secondary transfer residual toner) remaining on the intermediate transfer belt after the secondary transfer step are removed and collected from the intermediate transfer belt by a belt cleaning device as an intermediate transfer member cleaner. As the belt cleaning device, an electrostatic cleaning device that electrostatically collects toner on the intermediate transfer belt is known. The cleaning by this device is performed, for example, by applying a cleaning voltage to a cleaning member provided to be contactable with the outer peripheral surface of the intermediate transfer belt and supplying a cleaning current to a cleaning portion where the intermediate transfer belt and the cleaning member abut against each other.

In addition, for example, in a commercial printing market, an intermediate transfer belt including an elastic layer may be used. Since the intermediate transfer belt includes the elastic layer, it is possible to improve transferability to a recording material having an uneven surface, such as embossed paper.

In the image forming apparatus of the intermediate transfer system, there is an issue of an increase in the electric resistance of the intermediate transfer belt having many energizing portions as described above. This is remarkable in a case where the intermediate transfer belt includes the elastic layer and an ion-conductive type electroconductive material (ion-conductive material) is used for adjusting the electric resistance of the elastic layer.

In an ion-conductive belt containing the ion-conductive material, cations and anions causing the ion conductivity receive a force due to an electric field generated in the belt when a current flows. The positively charged cations move in the direction of the electric field, and the negatively charged anions move in the direction opposite to the electric field. For example, a case of a configuration in which toner whose normal charge polarity is the negative polarity is used will be considered. In this case, for the primary transfer, a positive voltage is applied to the primary transfer member abutting against the inner peripheral surface of the intermediate transfer belt, and a positive current is supplied in the direction from the inner peripheral surface side to the outer peripheral surface side of the intermediate transfer belt (hereinafter, also referred to as "outward direction") in the primary transfer portion. As a result, the cations move to the outer peripheral surface side of the intermediate transfer belt, and the anions move to the inner peripheral surface side of the intermediate transfer belt. In addition, for the secondary transfer, a positive voltage is applied to the secondary transfer member abutting against the outer peripheral surface of the intermediate transfer belt, and a positive current is supplied in the direction from the outer peripheral surface side to the inner peripheral surface side of the intermediate transfer belt (hereinafter, also referred to as "inward direction") in the secondary transfer portion. As described above, since the electric field in the direction opposite to that in the primary transfer portion is generated in the secondary transfer portion, the ions in the intermediate transfer belt at the time of the secondary transfer move in the direction opposite to that at the time of the primary transfer (the cations move to the inner peripheral surface side, and the anions move to the outer peripheral surface side). When the balance between the total amount of charges in the outward direction and the total amount of charges in the inward direction, which are supplied to the intermediate transfer belt, is largely lost, the ions in the intermediate transfer belt are unevenly distributed, and the electric resistance of the intermediate transfer belt increases. When the electric resistance of the intermediate transfer belt increases due to use and the voltage required to be applied for the primary transfer or the secondary transfer increases (the absolute value increases), an image defect caused by electric discharge in the primary transfer portion or the secondary transfer portion is likely to occur.

In order to suppress an increase in the electric resistance of the intermediate transfer belt and extend the endurance life of the intermediate transfer belt, a configuration using a conventional discharge device has been proposed. In the conventional discharge device, for example, a discharge member such as a conductive fur brush roller is made to abut against the intermediate transfer belt, and a discharge current is supplied to the intermediate transfer belt so as to balance the ions in the intermediate transfer belt by the discharge member. For example, in a tandem-type full-color image forming apparatus using toner whose normal charge polarity is the negative polarity, a positive current is supplied in the outward direction at four primary transfer portions, and a positive current is supplied in the inward direction at one secondary transfer portion. In this case, since the supply of the positive current in the outward direction increases, it is desirable to supply the discharge current of the positive polarity in the inward direction by the discharge member. In the configuration having the electrostatic cleaning device, the current supplied by the cleaning portion is also considered.

Here, in general, a value obtained by subtracting the sum of positive currents supplied in the direction (outward direction) from the inner peripheral surface side to the outer peripheral surface side of the intermediate transfer belt from the sum of positive currents supplied in the direction (inward direction) from the outer peripheral surface side to the inner peripheral surface side of the intermediate transfer belt is set as a current balance. In this case, the discharge current is set such that the current balance approaches zero. For example, the discharge current can be set on the basis of target values of the primary transfer current, the secondary transfer current, and the cleaning current.

Furthermore, during execution of a print job, for example, the primary transfer current and the secondary transfer current may change due to the presence or absence of toner, or readjustment of the primary transfer voltage and the secondary transfer voltage. Therefore, it may be desirable to change the discharge current on the basis of, for example, detection results of the primary transfer current and the secondary transfer current during execution of a print job.

However, when the discharge current is changed during execution of a print job, the charged state of the intermediate transfer belt changes, and the primary transfer current changes, which may cause image density unevenness.

SUMMARY

Therefore, the present disclosure is directed to suppressing the occurrence of image density unevenness caused by changing the discharge current during execution of a print job.

According to an aspect of the present disclosure, an image forming apparatus includes an image bearing member configured to bear a toner image, an intermediate transfer belt that is rotatable, endless, and onto which the toner image is to be transferred from the image bearing member, a primary transfer member configured to primarily transfer the toner image from the image bearing member onto the intermediate transfer belt by supplying a primary transfer current to the intermediate transfer belt at a primary transfer portion, a first power source configured to apply a voltage to the primary transfer member, a first detecting unit configured to detect a current supplied from the first power source, a secondary transfer member configured to secondarily transfer the toner image from the intermediate transfer belt onto a recording material by supplying a secondary transfer current to the intermediate transfer belt at a secondary transfer portion, a second power source configured to apply a voltage to the secondary transfer member, a second detecting unit configured to detect a current supplied from the second power source, a discharge member configured to supply a discharge current to the intermediate transfer belt at a discharge portion downstream of the secondary transfer portion and upstream of the primary transfer portion in a rotation direction of the intermediate transfer belt, a third power source configured to supply the discharge current, and a control unit configured to control the third power source, wherein, during execution of a print job of continuous image formation in which the toner image is continuously transferred onto a first recording material and a second recording material following the first recording material, the control unit controls the third power source such that the discharge current is subjected to constant current control based on a detection result detected by the first detecting unit during the print job and a detection result detected by the second detecting unit during the print job, and wherein, when changing the discharge current from a first discharge current to a second discharge current, the control unit controls the third power source such that, after an image forming region of a first image to be transferred onto the first recording material passes through the primary transfer portion, a trailing edge of a first discharge current supply region on the intermediate transfer belt, to which the first discharge current is supplied, initially passes through the primary transfer portion, and also controls the third power source such that, before an image forming region of a second image to be transferred onto the second recording material passes through the primary transfer portion, a leading edge of a second discharge current supply region on the intermediate transfer belt, to which the second discharge current is supplied, initially passes through the primary transfer portion.

Further features of the present disclosure will become apparent from the following description of exemplary embodiments with reference to the attached drawings.

DESCRIPTION OF THE EMBODIMENTS

Hereinafter, image forming apparatuses according to embodiments of the present disclosure will be described in detail with reference to the drawings. In an example, when changing a discharge current during execution of a print job of continuous image formation in which a toner image is continuously transferred onto a plurality of pieces of recording material, a control unit in an image forming apparatus controls a discharge power source so as to change the discharge current while a region on an intermediate transfer belt, which serves as an image-interval region between an image forming region of an image transferred onto a previous piece of the recording material and an image forming region of an image transferred onto a following piece of the recording material when passing through a primary transfer portion, is passing through a discharge portion immediately before passing through the primary transfer portion.

First Embodiment

1. Overall Configuration and Operation of Image Forming Apparatus

Figure 1:
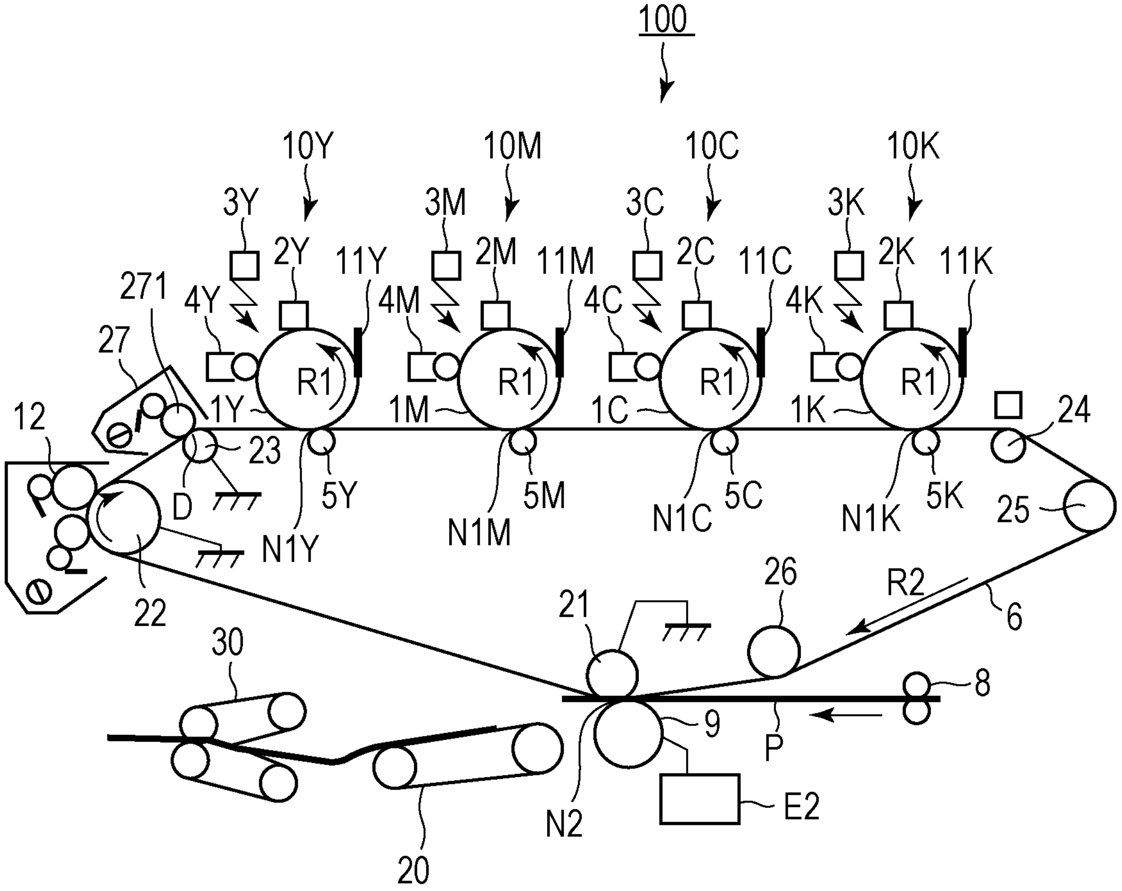
FIG. 1 is a schematic sectional view of an image forming apparatus.

FIG. 1 is a schematic sectional view of an image forming apparatus 100 of this embodiment. The image forming apparatus 100 of this embodiment is a tandem-type printer employing an intermediate transfer system and capable of forming a full-color image using an electrophotographic system.

The image forming apparatus 100 includes four image forming portions (stations) 10Y, 10M, 10C, and 10K for forming images of yellow (Y), magenta (M), cyan (C), and black (K), respectively. Elements having identical or corresponding functions or configurations in the image forming portions 10Y, 10M, 10C, and 10K may be collectively described by omitting the suffixes Y, M, C, and K of the reference numerals representing the elements for the respective colors. In this embodiment, the image forming portion 10 includes a photosensitive drum 1, a charging device 2, an exposing device 3, a developing device 4, a primary transfer roller 5, a drum cleaning device 11, and the like, which will be described later.

The photosensitive drum 1, which is a rotatable drum-shaped (cylindrical) photosensitive member (electrophotographic photosensitive member) as an image bearing member for bearing a toner image, is rotatably driven at a predetermined circumferential speed in an arrow R1 direction (counterclockwise direction) in the drawing. The surface of the rotating photosensitive drum 1 is uniformly charged to a predetermined potential of a predetermined polarity (negative polarity in this embodiment) by the charging device 2 as a charger. During the charging process, a predetermined charging voltage (charging bias) is applied to the charging device 2. The charged surface of the photosensitive drum 1 is subjected to scanning exposure on the basis of image information by the exposing device (laser beam scanner) 3 as an exposing unit, so that an electrostatic image (electrostatic latent image) corresponding to target image information is formed on the photosensitive drum 1. The exposing device 3 outputs laser light which is on/off-modulated in accordance with the image information input from an external device such as an image scanner or a computer, and scans and exposes the charged surface of the photosensitive drum 1. The electrostatic image formed on the photosensitive drum 1 is developed (visualized) by being supplied with toner as a developer by the developing device 4 as a developing unit, so that a toner image is formed on the photosensitive drum 1. In this embodiment, the toner charged to the same polarity (negative polarity in this embodiment) as the charge polarity of the photosensitive drum 1 is deposited on the exposure portion (image portion) on the photosensitive drum 1 in which the absolute value of the potential is lowered by the exposure on the basis of the image information after the uniform charging process (reversal developing system). In this embodiment, the normal charge polarity of the toner, which is the main charge polarity of the toner at the time of development, is the negative polarity. At the time of development, a predetermined developing voltage (developing bias) is applied to a developing roller as a developer bearing member (developing member) provided in the developing device 4.

Opposed to four photosensitive drums 1, an intermediate transfer belt 6 constituted by an endless belt as an intermediate transfer member is provided. The intermediate transfer belt 6 is disposed to be contactable with the surfaces of the four photosensitive drums 1. The intermediate transfer belt 6 is stretched around first to sixth stretching rollers 21 to 26 serving as a plurality of stretching rollers with a predetermined tension. In this embodiment, the first stretching roller 21 is a secondary transfer opposed roller (secondary transfer inner roller) functioning as an opposed member (counter electrode) of a secondary transfer roller 9, which will be described later. The second stretching roller 22 is a driving roller for the intermediate transfer belt 6. Furthermore, the third and fourth stretching rollers 23 and 24 are first and second auxiliary rollers for forming an image transfer surface of the intermediate transfer belt 6 onto which the toner images are primarily transferred from the photosensitive drums 1 as described later. The fifth stretching roller 25 is a tension roller configured to control the tension of the intermediate transfer belt 6 to be substantially constant.

The sixth stretching roller 26 is a pre-secondary-transfer roller that forms a surface of the intermediate transfer belt 6 entering a secondary transfer portion (secondary transfer nip, secondary transfer position) N2, which will be described later. A driving force is input to the intermediate transfer belt 6 by the driving roller 22 being rotatably driven, and the intermediate transfer belt 6 rotates (circularly moves) at a circumferential speed of 150 to 470 mm/sec in an arrow R2 direction (clockwise direction) in the drawing. On the inner peripheral surface (back surface) side of the intermediate transfer belt 6, primary transfer rollers 5Y, 5M, 5C, and 5K, which are roller-type primary transfer members (current supply members) as a primary transfer unit, are provided in correspondence with the photosensitive drums 1Y, 1M, 1C, and 1K, respectively. The primary transfer roller 5 is pressed against the photosensitive drum 1 via the intermediate transfer belt 6 to form a primary transfer portion (primary transfer nip portion, primary transfer position) N1 where the photosensitive drum 1 and the intermediate transfer belt 6 abut against (in contact with) each other.

The toner image formed on the photosensitive drum 1 as described above is transferred (primarily transferred) onto the rotating intermediate transfer belt 6 by the action of the primary transfer roller 5 at the primary transfer portion N1. At the time of primary transfer, to the primary transfer roller 5, a primary transfer voltage (primary transfer bias), which is a DC voltage controlled to a constant voltage of the opposite polarity (positive polarity in this embodiment) of the normal charge polarity of the toner, is applied by a primary transfer voltage source (high voltage source) E1 (in FIG. 5). As a result, the primary transfer current is supplied to the primary transfer portion N1. For example, at the time of the primary transfer, a primary transfer voltage controlled to a constant voltage of about +1 to +3 kilovolts (kV) is applied to each primary transfer roller 5, and a current of about +20 to +100 microamperes (μA) flows in the outward direction at each primary transfer portion N1. For example, when a full-color image is formed, the toner images of the respective colors of yellow, magenta, cyan, and black formed on the respective photosensitive drums 1 are sequentially transferred onto the intermediate transfer belt 6 in a superimposed manner. In this embodiment, the primary transfer voltage is applied to each primary transfer roller 5 in synchronization with the conveyance of the toner image of each color to the primary transfer portion N1. In this embodiment, the primary transfer roller 5 is constituted by a core metal (base material) and an elastic layer formed of an ion-conductive foamed rubber on the outer periphery of the core metal. In this embodiment, the outer diameter of the primary transfer roller 5 is 15 to 20 mm. Furthermore, in this embodiment, the electric resistance value of the primary transfer roller 5 is from $1\times10^5$ to $1\times10^8\Omega$ when measured by applying a voltage of 2 kV in an N/N environment (23° C., 50% RH).

On the outer peripheral surface side of the intermediate transfer belt 6, the secondary transfer roller (secondary transfer outer roller) 9, which is a roller-type secondary transfer member (current supply member) as a secondary transfer unit, is disposed at a position opposed to the secondary transfer opposed roller 21. The secondary transfer roller 9 is pressed against the secondary transfer opposed roller 21 via the intermediate transfer belt 6 to form the secondary transfer portion (secondary transfer nip, secondary transfer position) N2 where the intermediate transfer belt 6 and the secondary transfer roller 9 abut against each other (in direct contact each other or with a recording material P interposed therebetween). The toner image formed on the intermediate transfer belt 6 as described above is transferred (secondarily transferred) onto the recording material P sandwiched and conveyed between the intermediate transfer belt 6 and the secondary transfer roller 9 by the action of the secondary transfer roller 9 at the secondary transfer portion N2. In this embodiment, the secondary transfer roller 9 is constituted by a core metal (base material) and an elastic layer formed of an ion-conductive foamed rubber on the outer periphery of the core metal. In this embodiment, the outer diameter of the secondary transfer roller 9 is 20 to 25 mm. Furthermore, in this embodiment, the electric resistance value of the secondary transfer roller 9 is from $1\times10^5$ to $1\times10^8\Omega$ when measured by applying a voltage of 2 kV in an N/N environment (23° C., 50% RH). In this embodiment, the secondary transfer opposed roller 21 is constituted by a core metal (base material) and an elastic layer formed of an electroconductive rubber on the outer periphery of the core metal. In this embodiment, the outer diameter of the secondary transfer opposed roller 21 is 20 to 22 mm. Furthermore, in this embodiment, the electric resistance value of the secondary transfer opposed roller 21 is from $1\times10^5$ to $1\times10^8\Omega$ when measured by applying a voltage of 50 V in an N/N environment (23° C., 50% RH).

At the time of secondary transfer, to the secondary transfer roller 9, a secondary transfer voltage (secondary transfer bias), which is a DC voltage controlled to a constant voltage of the opposite polarity (positive polarity in this embodiment) of the normal charge polarity of the toner, is applied by a secondary transfer voltage source (high voltage source) E2. As a result, the secondary transfer current is supplied to the secondary transfer portion N2. For example, at the time of the secondary transfer, a secondary transfer voltage controlled to a constant voltage of about +1 to +7 kV is applied to the secondary transfer roller 9, and a current of about +40 to +120 μA flows in the inward direction at the secondary transfer portion N2. In this embodiment, the secondary transfer opposed roller 21 is electrically grounded (connected to the ground). The recording material (transfer material, recording medium, sheet) P is accommodated in a recording material accommodating portion (not illustrated) such as a feeding cassette. The recording material P is fed one by one from the recording material accommodating portion by a feeding member (not illustrated) such as a feeding roller being driven in response to a feeding start signal. Subsequently, the recording material P is conveyed to the secondary transfer portion N2 by a registration roller 8. The registration roller 8 is controlled to convey the recording material P to the secondary transfer portion N2 in synchronization with the timing at which the leading edge of the toner image on the intermediate transfer belt 6 reaches the secondary transfer portion N2. The recording material P is typically paper, but may be a resin sheet (film) such as synthetic paper or an overhead projector (OHP) sheet. Note that an inner roller corresponding to the secondary transfer opposed roller 21 in this embodiment may also be used as a secondary transfer member (current supply member), and a voltage of the opposite polarity of the voltage applied to the secondary transfer roller 9 in this embodiment may also be applied thereto. In this case, the outer roller corresponding to the secondary transfer roller 9 in this embodiment may be used as the opposed member and may be electrically grounded.

The recording material P on which the toner image is transferred is separated from the intermediate transfer belt 6 and is conveyed to a fixing device 30 as a fixing unit by a pre-fixing conveying device 20. The pre-fixing conveying device 20 includes an endless belt member, which is rotatable, formed of a rubber material such as ethylene-propylene terpolymer (EPDM), which is 100 to 110 mm wide and 1 to 3 mm thick, at a central portion in a direction substantially orthogonal to the conveying direction of the recording material P, and conveys the recording material P placed thereon. The belt member is provided with holes having diameters of 3 to 7 mm, and air is sucked from the inside of the belt member. As a result, the carrying force of the recording material P by the belt member is increased, so that the conveying property of the recording material P is stabilized. By a fixing rotary member pair, the fixing device 30 fixes (melts and fixes) the toner image on the recording material P by heating and pressing the recording material P carrying the unfixed toner image. The recording material P on which the toner image is fixed is ejected (output) to the outside of the apparatus main body of the image forming apparatus 100.

The toner (primary transfer residual toner) remaining on the photosensitive drum 1 without being transferred onto the intermediate transfer belt 6 at the time of the primary transfer is removed and collected from the photosensitive drum 1 by the drum cleaning device 11 as a photosensitive member cleaner. Deposits such as the toner (secondary transfer residual toner) remaining on the intermediate transfer belt 6 without being transferred onto the recording material P at the time of the secondary transfer are removed and collected from the intermediate transfer belt 6 by a belt cleaning device 12 as an intermediate transfer member cleaner. The belt cleaning device 12 will be described later in more detail. In this embodiment, the belt cleaning device 12 electrostatically collects the secondary transfer residual toner on the intermediate transfer belt 6.

2. Intermediate Transfer Member

Figure 4:
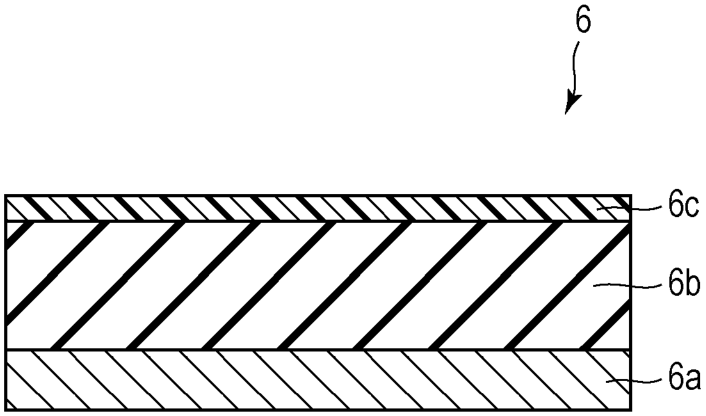
FIG. 4 is a schematic sectional view of an intermediate transfer belt.

FIG. 4 is a schematic sectional view of the intermediate transfer belt 6 in this embodiment. In this embodiment, the intermediate transfer belt 6 is constituted by a base layer (layer forming the inner peripheral surface) 6*a*, an elastic layer (intermediate layer) 6*b*, and a surface layer (layer forming the outer peripheral surface) 6*c*. The base layer 6*a* is formed of a material containing an appropriate amount of carbon black as an anti-static additive in a resin such as polyimide or polycarbonate or various rubbers, and is 0.05 to 0.15 [mm] thick. The elastic layer 6*b* is formed of a material containing an appropriate amount of an ion-conductive material in various rubbers such as chloroprene rubber (CR rubber), urethane rubber, and silicone rubber, and is 0.1 to 0.500 [mm] thick. The material of the elastic layer 6*b* may be, for example, a material obtained by mixing an ion-conductive polymer with a system containing a halogen-containing non-conductive polymer such as chloroprene rubber as a main component to adjust the electric resistance. The ion-conductive polymer may be a copolymer containing at least one of epichlorohydrin, ethylene oxide, propylene oxide, and allyl glycidyl ether and having a main chain and/or a side chain in which ether bonds are regularly arranged. In the configuration of this embodiment, it is considered that the negative ions easily move in the ion-conductive material. The surface layer 6*c* is formed of a resin such as urethane resin or fluororesin, and is 0.0002 to 0.020 [mm] thick.

In this embodiment, the intermediate transfer belt 6 has a volume resistivity of $5\times10^8$ to $1\times10^{14}$ [Ω·cm] (23° C., 50% RH). The hardness of the intermediate transfer belt 6 is 60 to 85° (23° C., 50% RH) in MD-1 hardness. In addition, the coefficient of static friction of the intermediate transfer belt 6 is 0.15 to 0.6 (23° C., 50% RH, type 94i manufactured by HEIDON Shinto Scientific Co. Ltd.).

3. Belt Cleaning Device

Figure 2:
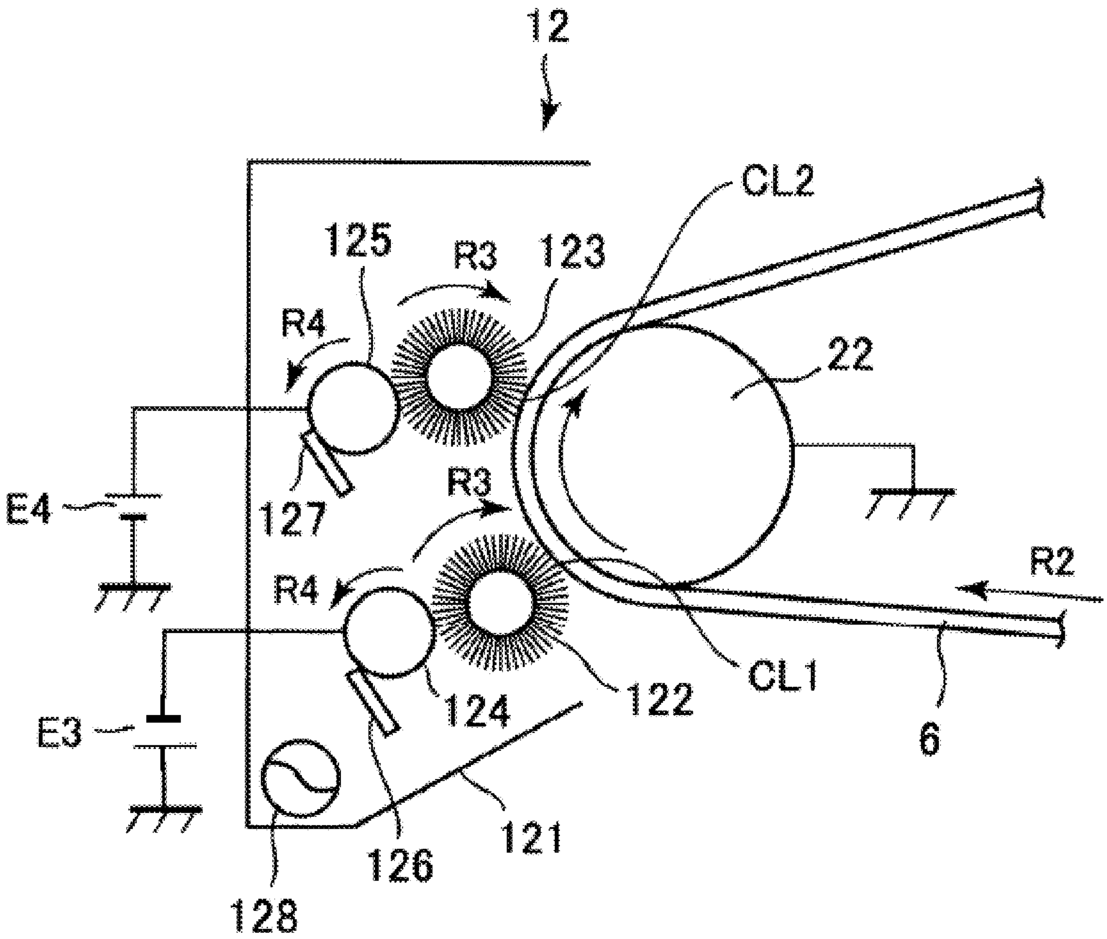
FIG. 2 is a schematic sectional view of a belt cleaning device and a vicinity thereof.

FIG. 2 is a schematic enlarged sectional view of the belt cleaning device 12 and a vicinity thereof in this embodiment. The belt cleaning device 12 is disposed downstream of the secondary transfer portion N2 and upstream of the primary transfer portion N1 (the most upstream primary transfer portion N1Y) in the rotation direction of the intermediate transfer belt 6, in particular, at a position opposed to the driving roller 22 via the intermediate transfer belt 6. In this embodiment, the belt cleaning device 12 is constituted by an electrostatic cleaning device for electrostatically collecting the toner on the intermediate transfer belt 6, in particular, an electrostatic brush cleaning device using a conductive fur brush roller.

In this embodiment, the belt cleaning device 12 has a housing 121 disposed near the intermediate transfer belt 6. The following members are provided inside the housing 121. First, first and second cleaning brushes 122 and 123 as first and second cleaning members (current supply members) are provided. In addition, first and second collecting rollers 124 and 125 as first and second collecting members are provided. Furthermore, first and second blades 126 and 127 as first and second scraping members are provided. The first and second cleaning brushes 122 and 123 are constituted by rotatable conductive fur brush rollers. The brush fibers of the first and second cleaning brushes 122 and 123 are made of carbon-dispersed nylon fibers, acrylic fibers, or polyester fibers having an electric resistance of $3\times10^5$ to $1\times10^{13}$ (Ω/cm) and a fiber thickness of 2 to 15 deniers. The first and second cleaning brushes 122 and 123 are formed by flocking the brush fibers on a metal roller as a base material at a flocking ratio of 50000 to 500000 fibers/inch$^2$. The first and second cleaning brushes 122 and 123 are disposed with a penetration amount of about 1.0 to 2.0 mm with respect to the intermediate transfer belt 6. In addition, the first and second cleaning brushes 122 and 123 are rotatably driven by a driving motor (not illustrated) as a driver in an arrow R3 direction (clockwise direction) in the drawing at a circumferential speed of 20 to 80% of the circumferential speed of the intermediate transfer belt 6. That is, the first and second cleaning brushes 122 and 123 rotate so as to move in the direction opposite to the moving direction of the intermediate transfer belt 6 at the portion abutting against the intermediate transfer belt 6, and rub the surface of the intermediate transfer belt 6. In this embodiment, the first and second cleaning brushes 122 and 123 are made to abut against the driving roller 22 functioning as an opposed member via the intermediate transfer belt 6. The driving roller 22 is electrically grounded. The first and second cleaning brushes 122 and 123 are disposed such that the rotational axis directions thereof are substantially parallel to a direction (also referred to as "width direction") substantially orthogonal to the moving direction of the surface of the intermediate transfer belt 6. The length of each of the first and second cleaning brushes 122 and 123 in the rotational axis direction is longer than a maximum image forming width on the intermediate transfer belt 6 in the width direction of the intermediate transfer belt 6. The portion where the first cleaning brush 122 and the intermediate transfer belt 6 abut against each other is a first cleaning portion (first cleaning position) CL1 where the first cleaning brush 122 collects the toner from the intermediate transfer belt 6. The portion where the second cleaning brush 123 and the intermediate transfer belt 6 abut against each other is a second cleaning portion (second cleaning position) CL2 where the second cleaning brush 123 collects the toner from the intermediate transfer belt 6. The first and second cleaning portions CL1 and CL2 are positioned downstream of the secondary transfer portion N2 and upstream of the primary transfer portion N1 (the most upstream primary transfer portion N1Y) in the rotation direction of the intermediate transfer belt 6. Furthermore, in this embodiment, the first cleaning portion CL1 is positioned upstream of the second cleaning portion CL2 in the rotation direction of the intermediate transfer belt 6.

The first and second collecting rollers 124 and 125 are constituted by rotatable rollers (metal rollers) made of metal (made of aluminum in this embodiment). The first and second collecting rollers 124 and 125 are disposed with a penetration amount of about 1.5 to 2.5 mm with respect to the first and second cleaning brushes 122 and 123. In addition, the first and second collecting rollers 124 and 125 are rotatably driven by a driving motor (not illustrated) as a driver in an arrow R4 direction (counterclockwise direction) in the drawing at a circumferential speed equal to that of the first and second cleaning brushes 122 and 123. That is, the first and second collecting rollers 124 and 125 rotate so as to move in the same direction as the moving direction of the first and second cleaning brushes 122 and 123 at the portions where the first and second collecting rollers 124 and 125 abut against the first and second cleaning brushes 122 and 123. The first and second collecting rollers 124 and 125 are disposed such that the rotational axis direction thereof is substantially parallel to the width direction of the intermediate transfer belt 6. The length of each of the first and second collecting rollers 124 and 125 in the rotational axis direction is equal to the length of each of the first and second cleaning brushes 122 and 123 in the rotational axis direction.

The first and second blades 126 and 127 are disposed to abut against the first and second collecting rollers 124 and 125. The first and second blades 126 and 127 are formed of a rubber material such as urethane rubber as an elastic member. Each of the first and second blades 126 and 127 is a plate-like member having a predetermined length in each of the longitudinal direction disposed substantially parallel to the rotational axis direction of each of the first and second collecting rollers 124 and 125 and the lateral direction substantially perpendicular to the longitudinal direction, and having a predetermined thickness. Each of the first and second blades 126 and 127 has a thickness of 1.6 to 2.2 mm and a hardness of 70 to 78° (23° C., 50% RH) in International Rubber Hardness Degrees (IRHD) hardness. The first and second blades 126 and 127 are disposed with a penetration amount of about 0.5 to 2.0 mm with respect to the first and second collecting rollers 124 and 125. The first and second blades 126 and 127 are made to abut against the first and second collecting rollers 124 and 125 in the counter direction (the direction in which a free end portion faces the upstream side in the rotation direction) with respect to the rotation direction of the first and second collecting rollers 124 and 125. The length of each of the first and second blades 126 and 127 in the longitudinal direction is equal to the length of each of the first and second collecting rollers 124 and 125 in the rotational axis direction.

In this embodiment, a first cleaning voltage (first cleaning bias) of the negative polarity, which is the same polarity as the normal charge polarity of the toner, is applied to the first cleaning brush 122 positioned on the upstream side in the rotation direction of the intermediate transfer belt 6. In this embodiment, a negative DC voltage subjected to constant current control is applied to the first collecting roller 124 by a first cleaning power source (high-voltage power source) E3, which is a DC power source. As a result, the negative DC voltage subjected to constant current control is applied to the first cleaning brush 122 via the first collecting roller 124.

In this embodiment, the first cleaning voltage is applied such that a first cleaning current of −73 μA flows from the first cleaning power source E3 to the first cleaning brush 122 (that is, the first cleaning portion CL1) via the first collecting roller 124. In this embodiment, the first cleaning current is −73 μA, but is not limited thereto. That is, at the time of cleaning of the intermediate transfer belt 6, in the first cleaning portion CL1, a positive current flows in the outward direction.

On the other hand, in this embodiment, a second cleaning voltage (second cleaning bias) of the positive polarity, which is the opposite polarity of the normal charge polarity of the toner, is applied to the second cleaning brush 123 positioned on the downstream side in the rotation direction of the intermediate transfer belt 6. In this embodiment, a positive DC voltage subjected to constant current control is applied to the second collecting roller 125 by a second cleaning power source (high-voltage power source) E4, which is a DC power source. As a result, the positive DC voltage subjected to constant current control is applied to the second cleaning brush 123 via the second collecting roller 125. In this embodiment, the second cleaning voltage is applied such that a second cleaning current of +73 μA flows from the second cleaning power source E4 to the second cleaning brush 123 (that is, the second cleaning portion CL2) via the second collecting roller 125.

In this embodiment, the second cleaning current is +73 μA, but is not limited thereto. That is, in this embodiment, at the time of cleaning of the intermediate transfer belt 6, in the second cleaning portion CL2, a positive current flows in the inward direction.

By applying the cleaning voltages to the first and second cleaning brushes 122 and 123, cleaning electric fields suitable for collecting the toner on the intermediate transfer belt 6 are formed between the first cleaning brush 122 and the intermediate transfer belt 6 and between the second cleaning brush 123 and the intermediate transfer belt 6. As a result, the secondary transfer residual toner on the intermediate transfer belt 6 is electrostatically absorbed to the first and second cleaning brushes 122 and 123 and is removed from the intermediate transfer belt 6. From the secondary transfer residual toner on the intermediate transfer belt 6, the toner charged to the positive polarity, which is the opposite polarity of the normal charge polarity, adheres to the first cleaning brush 122. From the secondary transfer residual toner on the intermediate transfer belt 6, the toner charged to the negative polarity, which is the normal charge polarity, adheres to the second cleaning brush 123. The toner moves from the first and second cleaning brushes 122 and 123 to the first and second collecting rollers 124 and 125 by electric fields formed between the first collecting roller 124 and the first cleaning brush 122 and between the second collecting roller 125 and the second cleaning brush 123. Furthermore, the toner that has moved to the first and second collecting rollers 124 and 125 is scraped off from the first and second collecting rollers 124 and 125 by the first and second blades 126 and 127. The toner scraped off from the first and second collecting rollers 124 and 125 is accommodated in the housing 121. The toner accommodated in the housing 121 is conveyed by, for example, a conveying member (such as a screw) 128 provided in the housing 121 and is ejected from the housing 121. Furthermore, the toner is conveyed toward a collection container (not illustrated) provided in, for example, the apparatus main body of the image forming apparatus 100.

In this embodiment, the driving roller 22 is used as a common opposed roller for the first and second cleaning brushes 122 and 123, but opposed rollers may be independently provided for the first and second cleaning brushes 122 and 123.

In addition, in this embodiment, the voltages are applied to the first and second collecting rollers 124 and 125, but the method of supplying the cleaning current is not limited thereto. For example, rollers opposed to the first and second cleaning brushes 122 and 123 via the intermediate transfer belt 6 are independently provided. These rollers may be used as current supply members, and voltages may be applied thereto. In this case, the first and second cleaning brushes 122 and 123 may be used as opposed members and may be electrically grounded via the first and second collecting rollers 124 and 125. In this case, voltages having the opposite polarities of those of the voltages applied to the first and second collecting rollers 124 and 125 in this embodiment may be applied to the respective rollers opposed to the first and second cleaning brushes 122 and 123. Thus, the intermediate transfer belt 6 can be cleaned as in this embodiment. Furthermore, a configuration in which voltages are directly applied to the first and second cleaning brushes 122 and 123 (or electrically grounded in a direct manner) may also be employed.

In addition, in this embodiment, as the belt cleaning device 12, the electrostatic cleaning device is used, but the present disclosure is not limited to such a configuration. For example, a belt cleaning device of a type in which the toner on the intermediate transfer belt 6 is scraped off by a cleaning member such as a cleaning blade may be used.

4. Discharge Device

Figure 3:
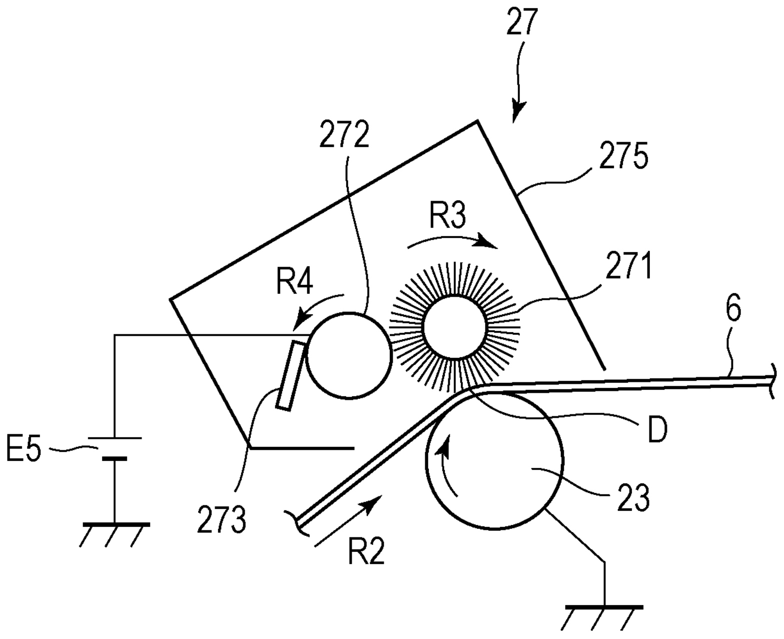
FIG. 3 is a schematic sectional view of a discharge device and a vicinity thereof.

FIG. 3 is a schematic enlarged sectional view of a discharge device 27 and a vicinity thereof in this embodiment. In this embodiment, the discharge device 27 as a discharger is disposed downstream of the secondary transfer portion N2 and upstream of the primary transfer portion N1 (the most upstream primary transfer portion N1Y) in the rotation direction of the intermediate transfer belt 6. In this embodiment, the discharge device 27 is disposed at a position opposed to the first auxiliary roller 23 via the intermediate transfer belt 6. That is, in this embodiment, the discharge device 27 is disposed downstream of the belt cleaning device 12 (the first and second cleaning portions CL1 and CL2) and upstream of the primary transfer portion N1 (the most upstream primary transfer portion N1Y) in the rotation direction of the intermediate transfer belt 6. In this embodiment, the discharge device 27 has substantially the same configuration as an electrostatic cleaning device, in particular, an electrostatic brush cleaning device using a conductive fur brush roller.

The discharge device (resistance increase suppressing device) 27 has a housing 275 disposed near the intermediate transfer belt 6. The following members are provided inside the housing 275. First, a discharge brush 271 as a discharge member (current supply member) is provided. In addition, a collecting roller 272 as a collecting member is provided. Furthermore, a blade 273 as a scraping member is provided.

The discharge brush 271 is constituted by a rotatable conductive fur brush roller. The brush fibers of the discharge brush 271 are made of carbon-dispersed nylon fibers, acrylic fibers, or polyester fibers having an electric resistance of $3\times10^5$ to $1\times10^{13}$ (Ω/cm) and a fiber thickness of 2 to 15 deniers. The discharge brush 271 is formed by flocking the brush fibers on a metal roller as a base material at a flocking ratio of 50000 to 500000 fibers/inch$^2$. The discharge brush 271 is disposed with a penetration amount of about 1.0 to 2.0 mm with respect to the intermediate transfer belt 6. In addition, the discharge brush 271 is rotatably driven by a driving motor (not illustrated) as a driver in the arrow R3 direction (clockwise direction) in the drawing at a circumferential speed of 20 to 80% of the circumferential speed of the intermediate transfer belt 6. That is, the discharge brush 271 rotates so as to move in the direction opposite to the moving direction of the intermediate transfer belt 6 at the portion abutting against the intermediate transfer belt 6, and rubs the surface of the intermediate transfer belt 6. In this embodiment, the discharge brush 271 is made to abut against the first auxiliary roller 23 functioning as an opposed member via the intermediate transfer belt 6. The first auxiliary roller 23 is electrically grounded. The discharge brush 271 is disposed such that the rotational axis direction thereof is substantially parallel to the width direction of the intermediate transfer belt 6. The length of the discharge brush 271 in the rotational axis direction is longer than the maximum image forming width on the intermediate transfer belt 6 in the width direction of the intermediate transfer belt 6. A portion where the discharge brush 271 and the intermediate transfer belt 6 abut against each other is a discharge portion (discharge position) D at which a current is supplied to the intermediate transfer belt 6 by the discharge brush 271 to balance the ions in the intermediate transfer belt 6. By supplying the discharge current to the intermediate transfer belt 6 in the discharge portion D, the intermediate transfer belt 6 is discharged to control the relationship between the current supplied to the intermediate transfer belt 6 in the inward direction and the current supplied to the intermediate transfer belt 6 in the outward direction. In this embodiment, the discharge portion D is positioned downstream of the belt cleaning device 12 (the first and second cleaning portions CL1 and CL2) and upstream of the primary transfer portion N1 (the most upstream primary transfer portion N1Y) in the rotation direction of the intermediate transfer belt 6. With the configuration in which the discharge portion D is disposed downstream of the first and second cleaning portions CL1 and CL2, it is possible to supply the discharge current to the intermediate transfer belt 6 in the cleaned state to efficiently discharge the intermediate transfer belt 6. However, in the configuration in which the discharge portion D is disposed upstream of and adjacent to the primary transfer portion N1, the influence of changing the discharge current, which will be described later, on an image is likely to be significant.

The collecting roller 272 is constituted by a rotatable roller (metal roller) made of metal (made of aluminum in this embodiment). The collecting roller 272 is disposed with a penetration amount of about 1.5 to 2.5 mm with respect to the discharge brush 271. In addition, the collecting roller 272 is rotatably driven by a driving motor (not illustrated) as a driver in the arrow R4 direction (counterclockwise direction) in the drawing at a circumferential speed equal to the circumferential speed of the discharge brush 271. That is, the collecting roller 272 rotates so as to move in the same direction as the moving direction of the discharge brush 271 at the portion abutting against the discharge brush 271. The collecting roller 272 is disposed such that the rotational axis direction thereof is substantially parallel to the width direction of the intermediate transfer belt 6. The length of the collecting roller 272 in the rotational axis direction is equal to the length of the discharge brush 271 in the rotational axis direction.

The blade 273 is disposed to abut against the collecting roller 272. The blade 273 is formed of a rubber material such as urethane rubber as an elastic member. The blade 273 is a plate-like member having a predetermined length in each of the longitudinal direction disposed substantially parallel to the rotational axis direction of the collecting roller 272 and the lateral direction substantially perpendicular to the longitudinal direction, and having a predetermined thickness. The blade 273 has a thickness of 1.6 to 2.2 mm and a hardness of 70 to 78° (23° C., 50% RH) in IRHD hardness. The blade 273 is disposed with a penetration amount of about 0.5 to 2.0 mm with respect to the collecting roller 272. The blade 273 is made to abut against the collecting roller 272 in the counter direction (the direction in which a free end portion faces the upstream side in the rotation direction) with respect to the rotation direction of the collecting roller 272. The length of the blade 273 in the longitudinal direction is equal to the length of the collecting roller 272 in the rotational axis direction.

In this embodiment, to the discharge brush 271, a discharge voltage (discharge bias) of the positive polarity, which is the opposite polarity of the normal charge polarity of the toner, is applied. In this embodiment, a positive DC voltage subjected to constant current control is applied to the collecting roller 272 by a discharge power source (high-voltage power source) E5, which is a DC power source. As a result, the positive DC voltage subjected to constant current control is applied to the discharge brush 271 via the collecting roller 272.

As a result, the discharge brush 271 (that is, the discharge portion D) is supplied with a discharge current for balancing the ions in the intermediate transfer belt 6. In this embodiment, at the time of the discharge for balancing the ions in the intermediate transfer belt 6, in the discharge portion D, the positive current is caused to flow in the inward direction. The discharge current will be described later in more detail.

In this embodiment, at least part of the negatively charged toner that has passed through the belt cleaning device 12 may be collected from the intermediate transfer belt 6 by the discharge device 27.

In this embodiment, the discharge device 27 has substantially the same configuration as an electrostatic cleaning device, and has a function of collecting at least part of the toner that has passed through the belt cleaning device 12. However, the discharge device 27 does not necessarily have the function of cleaning the intermediate transfer belt 6.

In addition, in this embodiment, the voltage is applied to the collecting roller 272, but the method of supplying the discharge current is not limited thereto. For example, a roller (corresponding to the first auxiliary roller 23 in this embodiment) opposed to the discharge brush 271 via the intermediate transfer belt 6 may be used as a current supply member, and the voltage may be applied thereto. In this case, the discharge brush 271 may be used as an opposed member and may be electrically grounded via the collecting roller 272. In this case, a voltage of the opposite polarity of the voltage applied to the collecting roller 272 in this embodiment may be applied to the roller (corresponding to the first auxiliary roller 23 in this embodiment) opposed to the discharge brush 271. Thus, discharge can be performed for balancing the ions in the intermediate transfer belt 6 as in this embodiment. Furthermore, a configuration in which a voltage is directly applied to the discharge brush 271 (or electrically grounded in a direct manner) may also be employed.

5. Control Mode

Figure 5:
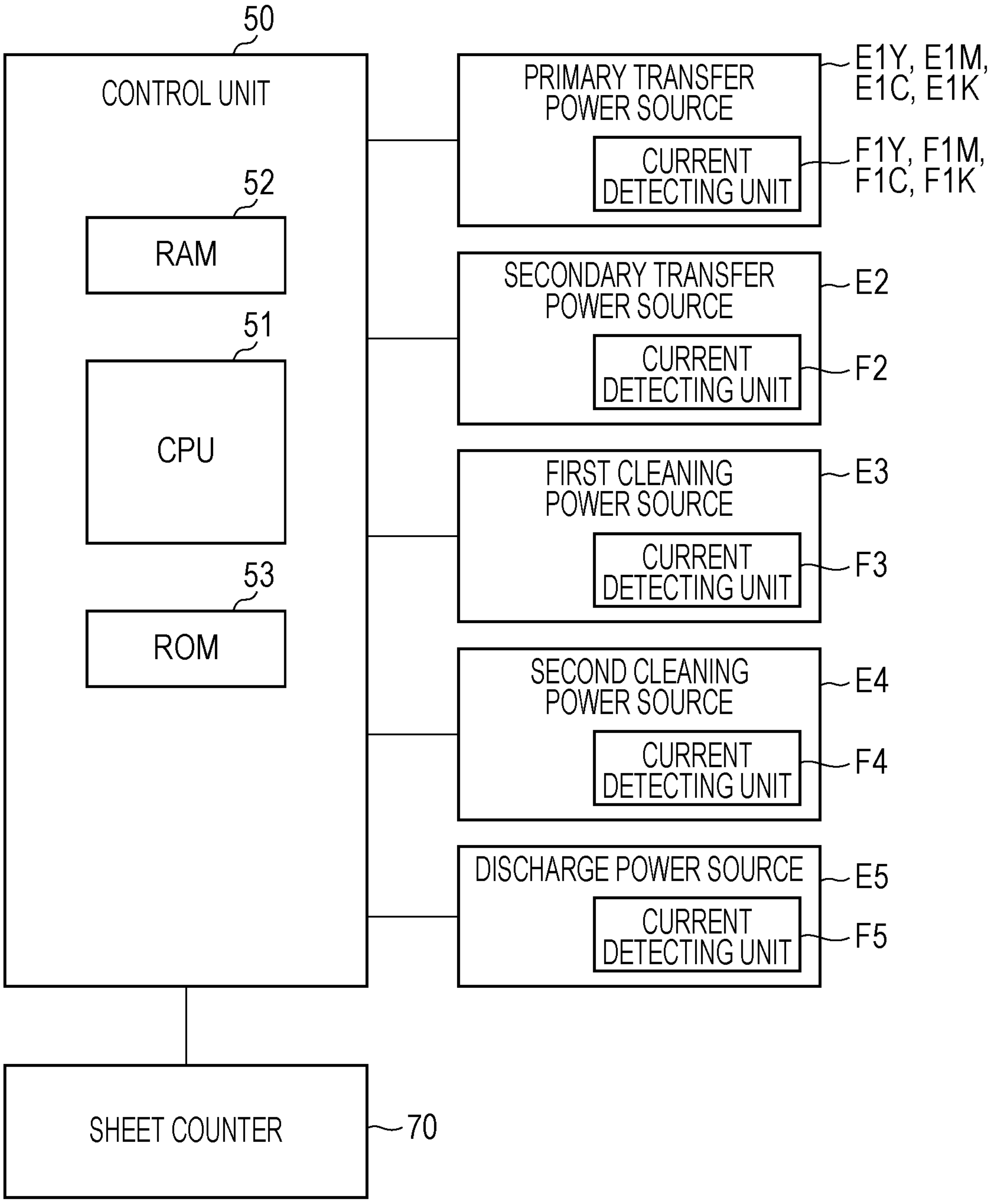
FIG. 5 is a schematic block diagram illustrating a control mode of the image forming apparatus.

FIG. 5 is a schematic block diagram illustrating a control mode of a main portion of the image forming apparatus 100 according to this embodiment. The image forming apparatus 100 includes a control unit 50 as a controller. The control unit 50 includes a central processing unit (CPU) 51 as an arithmetic controller, which is a central element for performing arithmetic processing, memories (storage media) such as a random-access memory (RAM) 52 and a read-only memory (ROM) 53 as a storage, and the like. The RAM 52, which is a rewritable memory, stores information input to the control unit 50, detected information, calculation results, and the like, and the ROM 53 stores a control program, a data table obtained in advance, and the like. The CPU 51 and the memories such as the RAM 52 and the ROM 53 can transfer and read data to each other.

An operation portion (not illustrated) provided in the image forming apparatus 100 is connected to the control unit 50. In addition, an external device (not illustrated) such as an image reading portion (image scanner) or a personal computer is connected to the control unit 50.

The control unit 50 integrally controls each portion of the image forming apparatus 100 on the basis of an instruction from the operation portion of the image forming apparatus 100, image data from the image reading portion, or an image forming signal (image data, control command) from an external device, and executes a print job (described later). In this embodiment, for example, the primary transfer power source E1, the secondary transfer power source E2, the first cleaning power source E3, the second cleaning power source E4, and the discharge power source E5 are connected to the control unit 50. In addition, in this embodiment, as a counter constituted by including a storage for counting the number of sheets of the recording material P on which an image is formed and which is output from the image forming apparatus 100, a sheet counter 70 is connected to the control unit 50. In this embodiment, the primary transfer power source E1 is independently provided for each image forming portion 10.

Here, the image forming apparatus 100 executes a print job, which is a series of operations for forming an image on a single piece or a plurality of pieces of the recording material P and outputting the single piece or plurality of pieces of the recording material P, and the print job is started by a start instruction. In this embodiment, the start instruction is input to the image forming apparatus 100 from the operation portion or external device. The print job generally includes an image forming step, a pre-rotation step, a sheet-interval step in a case where an image is formed on a plurality of pieces of the recording material P, and a post-rotation step. The image forming step is a period in which formation of an electrostatic image of the image that is to be actually formed on the recording material P to be output, formation of a toner image, and primary transfer and secondary transfer of the toner image are performed. This period is referred to as an image forming time. More specifically, the timing of the image forming time varies depending on the position for performing each of the electrostatic image formation, the toner image formation, and the primary transfer and the secondary transfer of the toner image, and corresponds to a period (hereinafter, also referred to as "sheet-passing period") in which an image forming region on the photosensitive drum 1 or the intermediate transfer belt 6 is passing through each position. The pre-rotation step is a period in which a preparation operation before the image forming step is performed from when the start instruction is input to the image forming apparatus 100 to when the image is actually started to be formed. The sheet-interval step (recording material-interval step, image-interval step) is a period (hereinafter, also referred to as "sheet-interval period") corresponding to an interval between pieces of the recording material P when the image formation on the plurality of pieces of the recording material P is continuously performed (continuous image formation). The post-rotation step is a period in which an arrangement operation (preparation operation) after the image forming step is performed. The period other than the image forming time is a non-image forming time, and includes the pre-rotation step, the sheet-interval step, the post-rotation step, and further a pre-multi-rotation step, which is a preparation operation at the time of power-on of the image forming apparatus 100 or at the time of return from the sleep state. More specifically, the timing of the non-image forming time corresponds to a period in which a non-image forming region on the photosensitive drum 1 or the intermediate transfer belt 6 is passing through each position for performing each of the electrostatic image formation, the toner image formation, and the primary transfer and the secondary transfer of the toner image. In this embodiment, in the sheet-interval step, as described later, the primary transfer voltage may be controlled in some cases. In this embodiment, the primary transfer voltage is controlled such that the primary transfer current becomes a target value in the sheet-interval step. Note that the image forming region on the photosensitive drum 1 or the intermediate transfer belt 6 is a region where the image transferred to the recording material P to be output from the image forming apparatus 100 can be formed, and the non-image forming region is a region other than the image forming region.

In addition, in this embodiment, the primary transfer power source E1 and the secondary transfer power source E2 respectively include current detecting units (one or more current detecting circuits) F1 and F2 as current detectors. The control unit 50 executes control (active transfer voltage control (ATVC)) for obtaining a voltage value at which the current values detected by the current detecting units F1 and F2 become predetermined target current values at the non-image forming time such as the pre-rotation step. Then, the primary transfer power source E1 and the secondary transfer power source E2 perform constant voltage control on the output values such that the current values become substantially constant at the above voltage value (or a voltage value determined on the basis of the above voltage value) at the image forming time (at the time of the primary transfer and at the time of the secondary transfer). In this embodiment, control is performed for independently determining the primary transfer voltage at each of the image forming portions 10Y, 10M, 10C, and 10K. In addition, in this embodiment, the first and second cleaning power sources E3 and E4 respectively include current detecting units (one or more current detecting circuits) F3 and F4 as current detectors. The first and second cleaning power sources E3 and E4 perform constant current control on the output values such that the current values detected by the current detecting units F3 and F4 become substantially constant at predetermined target current values at the image forming time (at the time of cleaning). The target current value related to each of the primary transfer voltage, the secondary transfer voltage, and the first and second cleaning voltages may be changed, for example, according to an image forming condition such as a detection result of the environment (at least one of the temperature and the humidity of at least one of the inside and the outside of the image forming apparatus 100). For example, according to the image forming condition, a corresponding value may be selected from a plurality of values (table values) set in advance. Furthermore, in order to readjust the primary transfer voltage and the secondary transfer voltage during execution of the print job, for example, control may be performed for determining the primary transfer voltage and the secondary transfer voltage in the sheet-interval step for each predetermined number of image-formed sheets. The control for readjusting the primary transfer voltage in the sheet-interval step (sheet-interval primary transfer current correction control) will be further described later. In this embodiment, the target values of the first and second cleaning currents are fixed to substantially constant values during execution of the print job. Furthermore, in this embodiment, the discharge power source E5 includes a current detecting unit (current detecting circuit) F5 as a current detector. When discharging the intermediate transfer belt 6, the discharge power source E5 performs constant current control on the output value such that the current value detected by the current detecting unit F5 becomes substantially constant at a target value of the discharge current obtained as described below. Note that each of the primary transfer power source E1, the secondary transfer power source E2, the first and second cleaning power sources E3 and E4, and the discharge power source E5 may further include a voltage detecting unit that detects an output voltage.

6. Sheet-Interval Primary Transfer Current Correction Control

Figure 6:
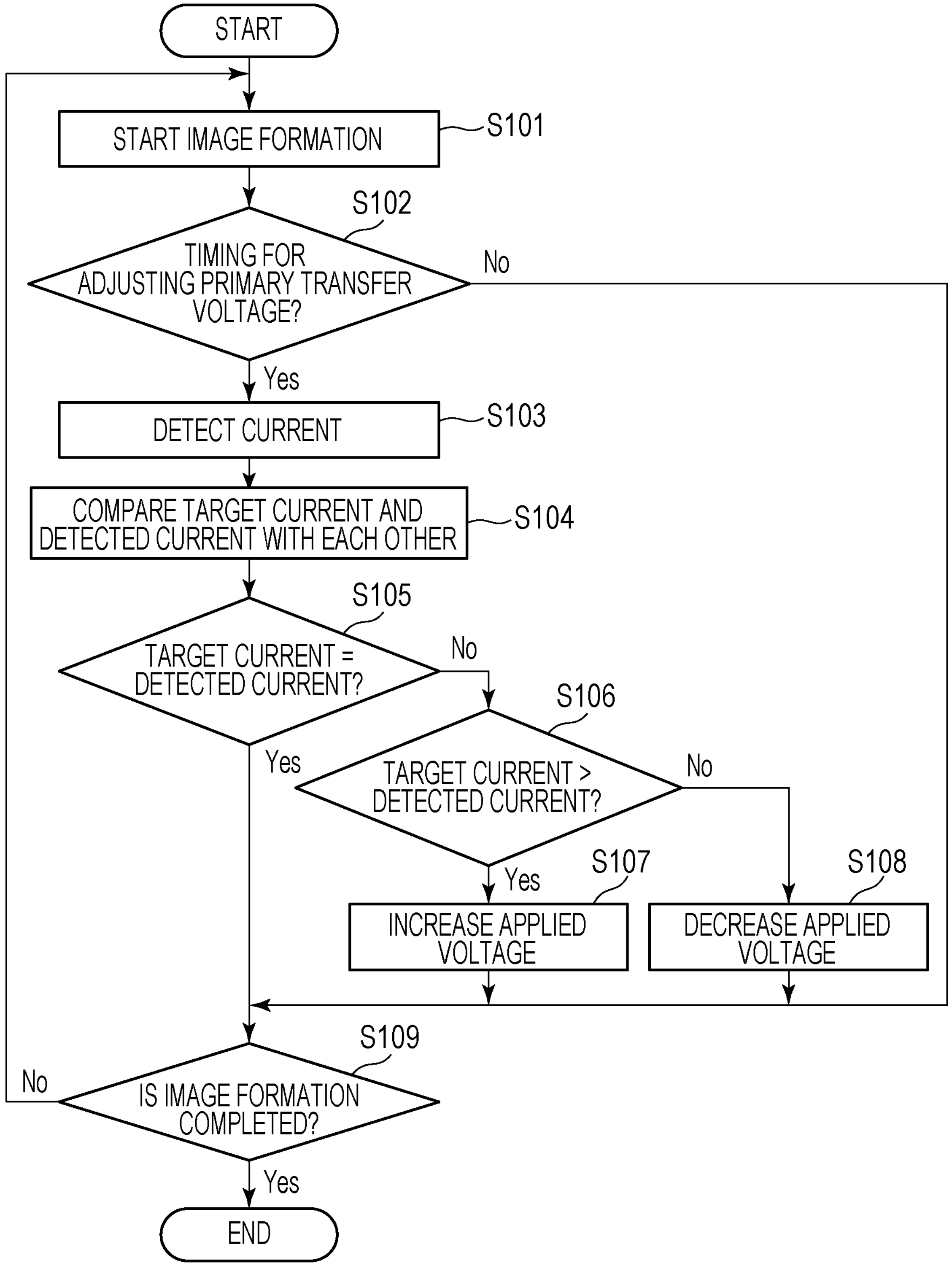
FIG. 6 is a flowchart illustrating an outline of a procedure of a sheet-interval primary transfer current correction control.

Sheet-interval primary transfer current correction control (also simply referred to as "sheet-interval control") in this embodiment will be described. FIG. 6 is a flowchart illustrating an outline of a procedure of sheet-interval control in this embodiment. In this embodiment, during execution of a print job, the control unit 50 performs, at a predetermined timing, control for correcting the primary transfer current (readjusting the primary transfer voltage) every time the number of sheets of the recording material P on which image formation is continuously performed, as information regarding the image forming time, exceeds a predetermined value (for example, 10 to 15 sheets) in the sheet-interval step.

When a print job is started and image formation is started (S101), the control unit 50 determines whether it is the timing for performing sheet-interval control (S102). In this embodiment, every time an image is formed (for example, secondarily transferred) on one sheet of the recording material P, the control unit 50 integrates the number of image-formed sheets and stores the integrated number in the sheet counter 70. Subsequently, the control unit 50 determines whether the number of image-formed sheets reaches a predetermined number of image-formed sheets (for example, 10 to 15 sheets), and if the number of image-formed sheets reaches the predetermined number, the control unit 50 determines that it is the timing for performing sheet-interval control. If the control unit 50 determines in S102 that it is not the timing for performing sheet-interval control ("No"), the process proceeds to S109. In addition, if the control unit 50 determines in S102 that it is the timing for performing sheet-interval control ("Yes"), the control unit 50 acquires the detection result of the primary transfer current in the sheet-interval step (S103). In this embodiment, sheet-interval control is performed independently at each of the image forming portions 10Y, 10M, 10C, and 10K. That is, in this embodiment, when a sheet-interval region (image-interval region), which is the same non-image forming region, sequentially passes through the primary transfer portion N1 of each image forming portion 10 from the most upstream image forming portion 10Y to the most downstream image forming portion 10K in the moving direction of the intermediate transfer belt 6, sheet-interval control (detecting the primary transfer current and changing the primary transfer voltage) for each of the image forming portions 10Y, 10M, 10C, and 10K is performed. As described above, in this embodiment, sheet-interval control for each of the image forming portions 10Y, 10M, 10C, and 10K is performed in synchronization in one sheet-interval step.

Subsequently, the control unit 50 compares the detection result of the primary transfer current (hereinafter, also referred to as "detected current") acquired in S103 with a target current (S104). The control unit 50 determines whether the target current and the detected current are equal to each other (S105). If the control unit 50 determines in S105 that the target current and the detected current are equal to each other ("Yes"), the process proceeds to S109. If the control unit 50 determines in S105 that the target current and the detected current are not equal to each other ("No"), the control unit 50 then determines whether the detected current is less than the target current (S106). If the control unit 50 determines in S106 that the detected current is less than the target current ("Yes"), in the sheet-interval step, the primary transfer voltage (absolute value) applied to the primary transfer roller 5 is increased such that the detected current approaches the target current (S107). If the control unit 50 determines in S106 that the detected current is greater than the target current ("No"), in the sheet-interval step, the primary transfer voltage (absolute value) applied to the primary transfer roller 5 is decreased such that the detected current approaches the target current (S108). In this embodiment, the control unit 50 adjusts the primary transfer voltage using a correspondence relationship between the difference between the target current and the detected current, which is stored in advance in the ROM 53, and a voltage (correction voltage) to be changed in S107 or S108. The control unit 50 adjusts the primary transfer voltage in S107 or S108, and then the process proceeds to S109.

In S109, the control unit 50 determines whether all image formation of the print job is completed. If the control unit 50 determines in S109 that the image formation is completed ("Yes"), the print job is ended. If the control unit 50 determines in S109 that the image formation is not completed ("No"), the process returns to S101.

In FIGS. 6, S105 to S108 are illustrated focusing on one image forming portion 10 as a representative, but substantially the same processing is performed for each of the image forming portions 10Y, 10M, 10C, and 10K. In addition, if the control unit 50 determines in S102 that it is the timing for performing sheet-interval control and executes the subsequent process, the control unit 50 resets the count value of the number of image-formed sheets regarding the timing for performing sheet-interval control stored in the sheet counter 70 to an initial value (zero in this embodiment). Furthermore, in the example of FIG. 6, it is determined in S105 whether the target current and the detected current are equal to each other. However, for example, if the difference between the target current and the detected current exceeds a predetermined value, the primary transfer voltage may also be adjusted such that the difference becomes less than or equal to the predetermined value.

7. Discharge Current

Figure 7:
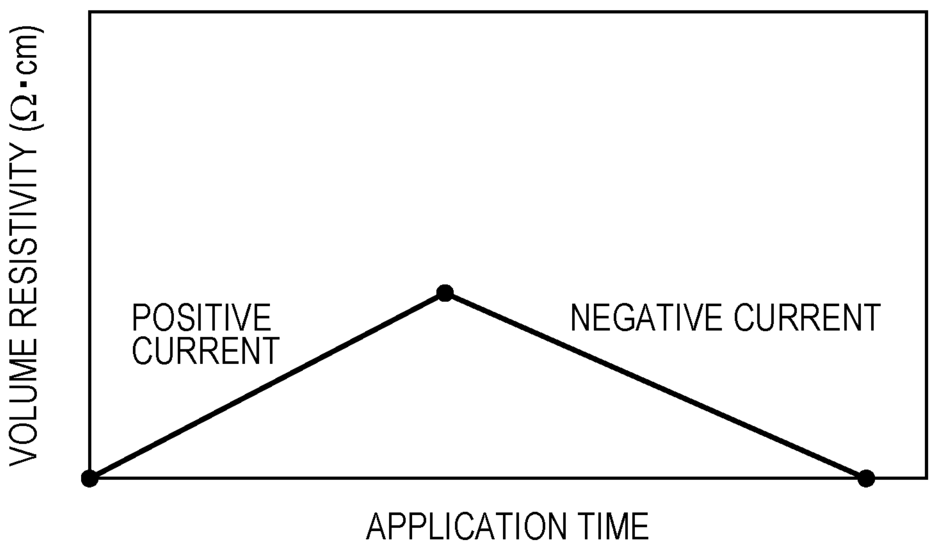
FIG. 7 is a graph illustrating an example of a relationship between a voltage application time (current supply time) and an electric resistance of the intermediate transfer belt.
Figure 8:
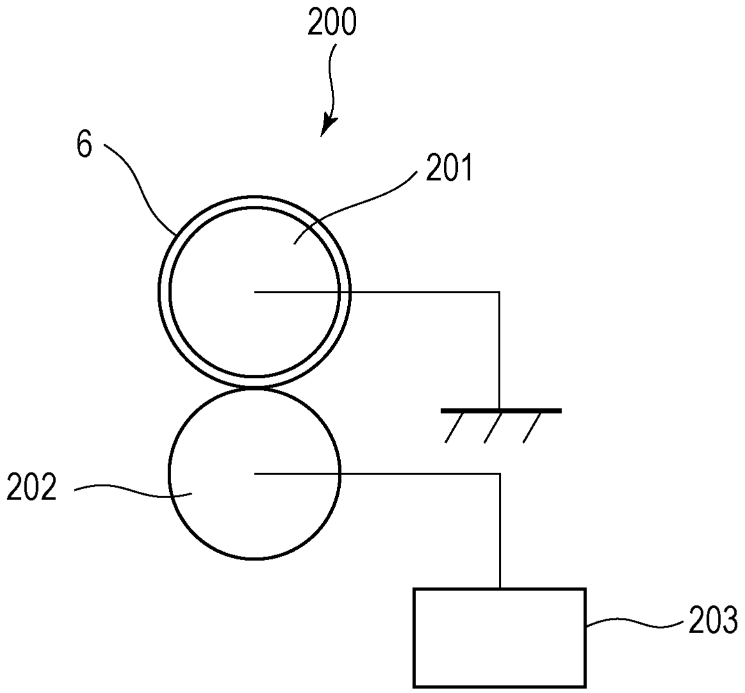
FIG. 8 is a schematic view of a measuring apparatus for measuring the relationship of FIG. 7.

FIG. 7 is a graph illustrating an example of a relationship between a voltage application time (current supply time) to the intermediate transfer belt 6 and the electric resistance (volume resistivity) of the intermediate transfer belt 6. FIG. 8 is a schematic view of a measuring apparatus 200 for measuring the above relationship. As illustrated in FIG. 8, the intermediate transfer belt 6 is wound around a first roller 201, and a second roller 202 is made to abut against the intermediate transfer belt 6. The intermediate transfer belt 6 is wound around the first roller 201 such that the base layer 6*a* is in contact with the first roller 201 and the second roller 202 abuts against the outer peripheral surface of the surface layer 6*c*. Then, while both the first roller 201 and the second roller 202 are rotated at a substantially constant speed, the first roller 201 is electrically grounded, and a current is supplied from a high-voltage power source 203 to the second roller 202. At this time, first, a current is supplied from the high-voltage power source 203 such that a current having the positive polarity and a substantially constant current value flows in the direction from the second roller 202 to the first roller 201 via the intermediate transfer belt 6. As illustrated in FIG. 7, the electric resistance of the intermediate transfer belt 6 having the ion-conductive elastic layer 6*b* increases in proportion to the current supply time. In addition, after a predetermined time has elapsed, the current is changed such that a current having substantially the same absolute value as the above current and the negative polarity, which is the opposite polarity of the above polarity, flows in the direction from the second roller 202 to the first roller 201 via the intermediate transfer belt 6. Then, the electric resistance of the intermediate transfer belt 6 substantially returns to the original value after substantially the same predetermined time as the above-described time has elapsed.

Here, in general, by subtracting the sum of positive currents supplied in the direction (outward direction) from the inner peripheral surface side to the outer peripheral surface side of the intermediate transfer belt 6 from the sum of positive currents supplied in the direction (inward direction) from the outer peripheral surface side to the inner peripheral surface side of the intermediate transfer belt 6, the current balance of the current supplied to the intermediate transfer belt 6 can be obtained. However, in this embodiment, the current balance is obtained by subtracting the current per unit length in the width direction of the intermediate transfer belt 6 in a region where the current is supplied by a current supply member. The length of the region where the current is supplied by the current supply member in the width direction of the intermediate transfer belt 6 is the length of the shorter one of the current supply member and the opposed member opposed to the current supply member via the intermediate transfer belt 6 in the width direction. For simplicity, the length of the region where the current is supplied by the current supply member in the width direction of the intermediate transfer belt 6 is also simply referred to as "the length of the current supply member in the longitudinal direction" or "the longitudinal length of the current supply member". By using the current balance per unit length of the current supplied region, the current balance can be more accurately evaluated regardless of the length of the current supplied region. Hereinafter, unless otherwise stated, the current balance refers to the current balance per unit length of the current supplied region as described above. That is, the current balance is a value obtained by subtracting "the sum of positive currents (absolute values) per unit length of the current supply member in the longitudinal direction, supplied by the current supply member in the direction (outward direction) from the inner peripheral surface side to the outer peripheral surface side of the intermediate transfer belt 6", from "the sum of positive currents (absolute values) per unit length of the current supply member in the longitudinal direction, supplied by the current supply member in the direction (inward direction) from the outer peripheral surface side to the inner peripheral surface side of the intermediate transfer belt 6". In other words, in a case where the current per unit length of the current supply member in the longitudinal direction, supplied in the direction (outward direction) from the inner peripheral surface side to the outer peripheral surface side of the intermediate transfer belt 6, is represented by a positive value, and the current per unit length of the current supply member in the longitudinal direction, supplied in the direction (inward direction) from the outer peripheral surface side to the inner peripheral surface side of the intermediate transfer belt 6, is represented by a negative value, the current balance can be the sum of the currents per unit length supplied by each current supply member.

In addition, the discharge current is set such that the current balance approaches zero.

The discharge current is a current in the range of ±50% of the target current value of the discharge current with a current balance of 0 microampere per millimeter (μA/mm) (for example, the range of ±100 μA in a case where the target current value is 200 μA, that is, from 100 μA to 300 μA), or may be a current in the range of ±30% or a current in the range of ±5%. When the discharge current exceeds the range of ±50%, the effect of suppressing the increase in the electric resistance of the intermediate transfer belt 6 may be insufficient.

Next, the calculation of the discharge current supplied to the discharge brush 271 as the discharge member will be described. In this embodiment, in consideration of the above-described characteristic of the intermediate transfer belt 6, the discharge current is calculated in the following manner.

In this embodiment, the current is supplied to the intermediate transfer belt 6 at the primary transfer portion N1, the secondary transfer portion N2, the first and second cleaning portions CL1 and CL2 by the primary transfer roller 5, the secondary transfer roller 9, and the first and second cleaning brushes 122 and 123, respectively. Therefore, in this embodiment, the discharge current supplied to the discharge brush 271 at the image forming time (during image formation) is obtained by the following formula (1). That is, the current density is obtained by dividing each of the absolute values of the currents supplied to the intermediate transfer belt 6 by the primary transfer roller 5, the secondary transfer roller 9, and the first and second cleaning brushes 122 and 123 at the image forming time (during image formation) by the longitudinal length of each member. In addition, by subtracting the sum of current densities of positive currents supplied in the direction (inward direction) from the outer peripheral surface side to the inner peripheral surface side of the intermediate transfer belt 6 from the sum of current densities of positive currents supplied in the direction (outward direction) from the inner peripheral surface side to the outer peripheral surface side of the intermediate transfer belt 6, the difference between the above current densities is obtained. Then, the value is multiplied by the longitudinal length of the discharge brush 271. In this embodiment, the discharge current having the value obtained by the following formula (1) in the above manner is supplied to the discharge brush 271 at the image forming time (during image formation).

$$\mathrm{Idis}=\{(It1y+It1m+It1c+It1k)/Rt1 \\ -It2/Rt2 \\ +Icl1/Rcl1 \\ Ic12/Rcl2\}\times \mathrm{Rdis} \quad (1)$$

Rt1: longitudinal length of primary transfer roller
Rt2: longitudinal length of secondary transfer roller
Rcl1: longitudinal length of first cleaning brush
Rcl2: longitudinal length of second cleaning brush
Rdis: longitudinal length of discharge brush
It1y, It1m, It1c, It1k: primary transfer current
It2: secondary transfer current
Icl1: first cleaning current
Icl2: second cleaning current
Idis: discharge current In this embodiment, the length of a region where the current is supplied by the primary transfer roller 5 in the width direction of the intermediate transfer belt 6 is the length of the primary transfer roller 5 in the longitudinal direction, which is the shorter one of the lengths of the primary transfer roller 5 and the photosensitive drum 1 in the direction. The length of a region where the current is supplied by the secondary transfer roller 9 in the width direction of the intermediate transfer belt 6 is the length of the secondary transfer roller 9 in the longitudinal direction, which is the shorter one of the lengths of the secondary transfer roller 9 and the secondary transfer opposed roller 21 in the direction. The length of a region where the current is supplied by the first cleaning brush 122 in the width direction of the intermediate transfer belt 6 is the length of the first cleaning brush 122 in the longitudinal direction, which is the shorter one of the lengths of the first cleaning brush 122 and the driving roller 22 in the direction. The length of a region where the current is supplied by the second cleaning brush 123 in the width direction of the intermediate transfer belt 6 is the length of the second cleaning brush 123 in the longitudinal direction, which is the shorter one of the lengths of the second cleaning brush 123 and the driving roller 22 in the direction. The length of a region where the current is supplied by the discharge brush 271 in the width direction of the intermediate transfer belt 6 is the length of the discharge brush 271 in the longitudinal direction, which is the shorter one of the lengths of the discharge brush 271 and the first auxiliary roller 23 in the direction.

The image forming time (during image formation) regarding the currents supplied to the above-described respective portions (the primary transfer portion N1, the secondary transfer portion N2, the first and second cleaning portions CL1 and CL2, and the discharge portion D) can be represented by a period in which the image forming region on the intermediate transfer belt 6 is passing through the respective portions. That is, the primary transfer current at the image forming time can be represented by the primary transfer current when the image forming region on the intermediate transfer belt 6 during the primary transfer of the image is passing through the primary transfer portion N1. In addition, the secondary transfer current at the image forming time can be represented by the secondary transfer current when the recording material P during the secondary transfer of the image is passing through the secondary transfer portion N2. Furthermore, the first and second cleaning currents at the image forming time can be represented by the first and second cleaning currents when the image forming region on the intermediate transfer belt 6 immediately after the image is transferred onto the recording material P at the secondary transfer portion N2 is passing through the first and second cleaning portions CL1 and CL2. Furthermore, the discharge current at the image forming time can be represented by the discharge current when the image forming region on the intermediate transfer belt 6 immediately after the image is transferred onto the recording material P at the secondary transfer portion N2 is passing through the discharge portion D. However, a predetermined period in a print job (for example, a period from the start of feeding of one sheet of the recording material P to the end of ejection) may be set as a period for one image-formed sheet, and, for example, an average value for each period may be set as the current supplied at each portion at the image forming time. From the viewpoint of setting a discharge current that can sufficiently suppress an increase in the electric resistance of the intermediate transfer belt 6, it is only necessary to estimate the substantial current balance of the current supplied to the intermediate transfer belt 6 with sufficient accuracy.

Here, in this embodiment, when a print job is started, the values of the primary transfer current and the secondary transfer current are substantially always detected. Then, in this embodiment, on the basis of the detected current values, the discharge current is calculated at a predetermined timing, which is, for example, every predetermined number of image-formed sheets (for example, 1 to 20 sheets), and the discharge current is changed to a newly calculated value. By calculating the discharge current using the detection results of the primary transfer current and the secondary transfer current, even if the primary transfer current and the secondary transfer current deviate from the values at the time of power-on of the image forming apparatus 100, the discharge current can be changed to the optimal discharge current at that time. During execution of a print job, the primary transfer current and the secondary transfer current may unintentionally change due to the presence or absence of toner, change in the electric resistance of the intermediate transfer belt 6 or the recording material P, or the like. Furthermore, during execution of a print job, the primary transfer current and the secondary transfer current may unintentionally change due to readjustment of the primary transfer voltage and the secondary transfer voltage. Before the detection results of the primary transfer current and the secondary transfer current in the print job become available (for example, before the image formation is performed for the initial predetermined number of image-formed sheets), the following operation can be performed. For example, the discharge current can be calculated using the target values (table values) of the primary transfer current and the secondary transfer current, or the discharge current in a print job before this time (for example, the last-time print job) can be used.

In this embodiment, as the first and second cleaning currents, the target values of the first and second cleaning currents subjected to constant current control are used to calculate the discharge current. In this embodiment, as described above, each of the first and second cleaning power sources E3 and E4 performs constant current control such that the current detected by the current detecting unit is substantially constant at the target value. Therefore, the discharge current may be calculated using the detection results of the first and second cleaning currents (which may be, for example, average values for the number of image-formed sheets).

Table 1 illustrates examples of initial values of the respective currents at the time of power-on of the image forming apparatus 100 in this embodiment. However, the values of the currents are not limited to these values. When the values illustrated in Table 1 are applied to the formula (1), the discharge current is 207.9 μA.

TABLE 1

| | Current value | | Longitudinal length | |
|---|---|---|---|---|
| | Symbol | [μA] | Symbol | [mm] |
| Primary transfer target current (Y) | It1y | 74 | Rt1 | 331.6 |
| Primary transfer target current (M) | It1m | 74 | Rt1 | 331.6 |
| Primary transfer target current (C) | It1c | 74 | Rt1 | 331.6 |
| Primary transfer target current (K) | It1k | 74 | Rt1 | 331.6 |
| Secondary transfer target current | It2 | 95 | Rt2 | 338 |
| First cleaning target current | Icl1 | 73 | Rcl1 | 340 |
| Second cleaning target current | Icl2 | 73 | Rcl2 | 340 |
| Discharge current | Idis | Obtained from formula (1) | Rdis | 340 |

8. Influence of Discharge Current on Image

Figure 9:
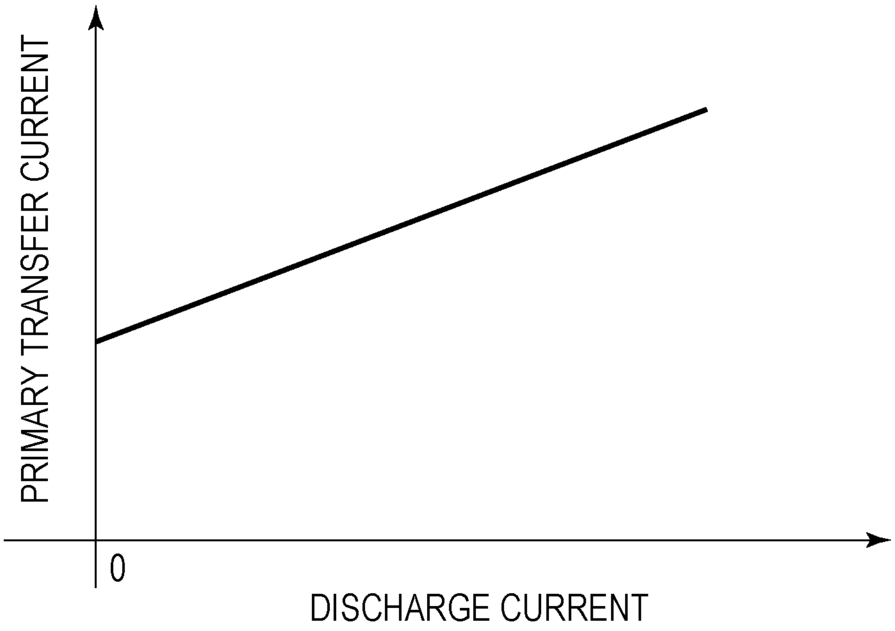
FIG. 9 is a graph illustrating an example of a relationship between a discharge current and a primary transfer current.
Figure 10:
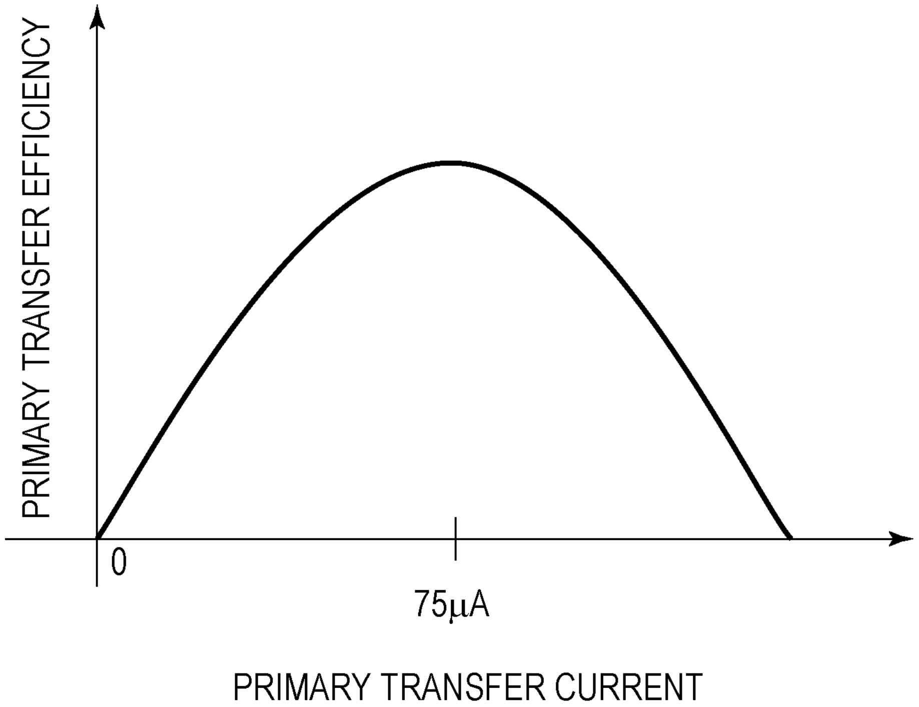
FIG. 10 is a graph illustrating an example of a relationship between the primary transfer current and a primary transfer efficiency.

FIG. 9 is a graph illustrating an example of a relationship between the discharge current and the primary transfer current for explaining the influence on the primary transfer current when the discharge current is changed. FIG. 10 is a graph illustrating an example of a relationship between the primary transfer current and a primary transfer efficiency.

As illustrated in FIG. 9, when the discharge current is increased, the primary transfer current increases. When the discharge current is decreased, the primary transfer current decreases. This is considered to be due to the influence of charging of the intermediate transfer belt 6 by the current supplied from the discharge brush 271. As illustrated in FIG. 10, the primary transfer efficiency peaks when the primary transfer current is a certain value (around 75 μA in this embodiment). In a case where the primary transfer current is greater than this value (around 75 μA in this embodiment), the primary transfer efficiency is lowered by the re-transfer, and in a case where the primary transfer current is less than this value (around 75 μA in this embodiment), the transfer electric field is insufficient, so that the primary transfer efficiency is lowered. When the primary transfer efficiency is lowered, the amount of toner to be transferred is reduced, so that a phenomenon in which the image density decreases occurs.

As described above, the discharge current is set so as to bring the current balance close to zero, but it may be desired to change the discharge current during execution of a print job. However, when the discharge current is changed during execution of a print job, the above-described phenomenon may occur. That is, when the discharge current is changed during execution of a print job, the charged state of the intermediate transfer belt 6 after the discharge current is changed becomes different from that before the discharge current is changed, and the primary transfer current changes, which may lower the primary transfer efficiency and cause a difference in the image density (image density unevenness).

9. Discharge Current Change Timing

Next, the timing for changing the discharge current during execution of a print job of continuous image formation in this embodiment will be described.

Figure 11:
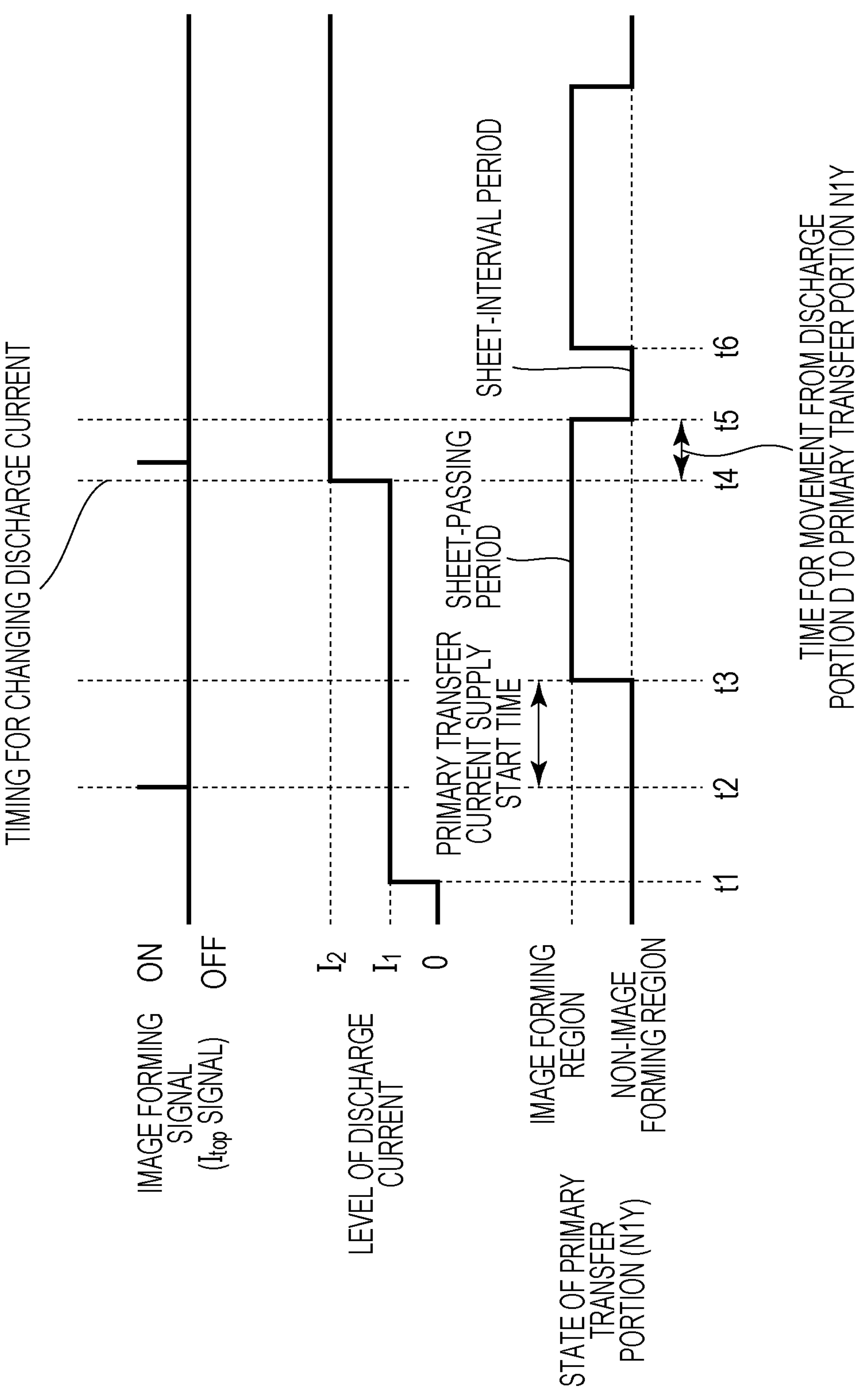
FIG. 11 is a timing chart for explaining a timing for changing the discharge current.
Figure 12:
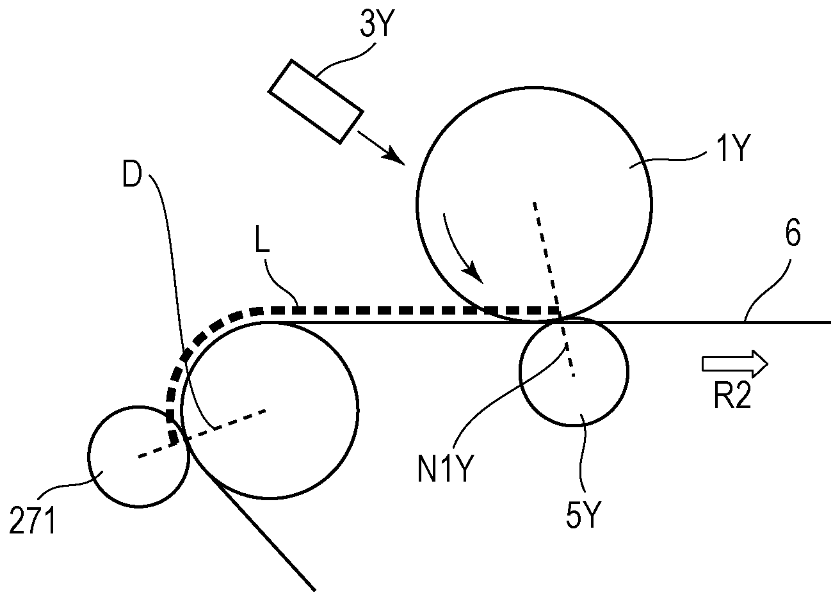
FIG. 12 is a schematic view illustrating a positional relationship between the discharge device and a primary transfer device.

FIG. 11 is a timing chart for explaining timing for changing the discharge current during execution of a print job in this embodiment. FIG. 11 illustrates ON/OFF of an image forming signal (I top signal), the level of the discharge current (11, 12), and the state of the primary transfer portion N1 (the most upstream primary transfer portion N1Y) during the sheet-passing period/sheet-interval period. FIG. 12 schematically illustrates a positional relationship between the discharge portion D and the primary transfer portion N1 (the most upstream primary transfer portion N1Y) disposed downstream of the discharge portion D in the moving direction of the intermediate transfer belt 6.

During execution of a print job, a region on the intermediate transfer belt 6 serves as the image forming region (sheet-passing region) when passing through the primary transfer portion N1. Immediately before that, if the discharge current is changed while the region is passing through the discharge portion D, the following may occur. That is, the image density unevenness may occur in which the image density decreases in the middle in the conveyance direction of the recording material P on the surface of the recording material P.

Therefore, in this embodiment, during execution of a print job, the control unit 50 performs control to change the discharge current while the region on the intermediate transfer belt 6, which serves as the sheet-interval region (image-interval region) when passing through the primary transfer portion N1, is passing through the discharge portion D immediately before that.

That is, in this embodiment, during execution of a print job, the control unit 50 performs control to change the discharge current at a timing corresponding to the following sheet-interval period.

As illustrated in FIG. 11, when the print job is started, the supply of the discharge current is started (t1), and when image formation is started, the supply of the primary transfer current is started (t2). Subsequently, in the primary transfer portion N1Y, the sheet-passing period starts (t3), and after a predetermined time has elapsed, the sheet-passing period ends and the sheet-interval period starts (t5). Subsequently, in the primary transfer portion N1Y, after a predetermined time has elapsed, the sheet-interval period ends, and the next sheet-passing period starts (t6). At this time, for example, the discharge current is changed while the region on the intermediate transfer belt 6, which passes through the primary transfer portion N1Y in the sheet-interval period from t5 to t6, is passing through the discharge portion D. That is, the discharge current is changed at the timing (t4) which is earlier by a predetermined time than the timing (t5) at which the region on the intermediate transfer belt 6, which passes through the primary transfer portion N1Y during the sheet-interval period, reaches the primary transfer portion N1Y. It is possible to set t4 to a timing earlier than t5 by a time required for the intermediate transfer belt 6 to move by a length L (FIG. 12) from the discharge portion D to the primary transfer portion N1Y. However, the present disclosure is not limited to this, and the region on the intermediate transfer belt 6, which has been in the discharge portion D at t4, being in the primary transfer portion N1Y in the period after t5 and before t6 may suffice. Although FIGS. 11 and 12 focus on the most upstream primary transfer portion N1Y, the same sheet-interval region including the portion where the discharge current is changed moves so as to sequentially pass from the most upstream primary transfer portion N1Y to the most downstream primary transfer portion N1K in the moving direction of the surface of the intermediate transfer belt 6.

In this manner, during execution of the print job, by changing the discharge current at the timing corresponding to the following sheet-interval period, it is possible to suppress the occurrence of the image density unevenness in which the image density decreases in the middle in the conveyance direction of the recording material P on the surface of the recording material P.

However, during execution of the print job, even if the discharge current is changed at the timing corresponding to the following sheet-interval period, the image density unevenness in which the image density decreases on the recording material P after the sheet-interval region (after the discharge current is changed) occurs in some cases. The image density unevenness between pieces of the recording material P with the sheet-interval region interposed therebetween is less conspicuous than the image density unevenness on the surface of the recording material P described above. However, for example, depending on the image to be printed, the image density unevenness is likely to be visually recognized, and thus it is desired to suppress the image density unevenness in order to further improve the image quality.

Figure 13:
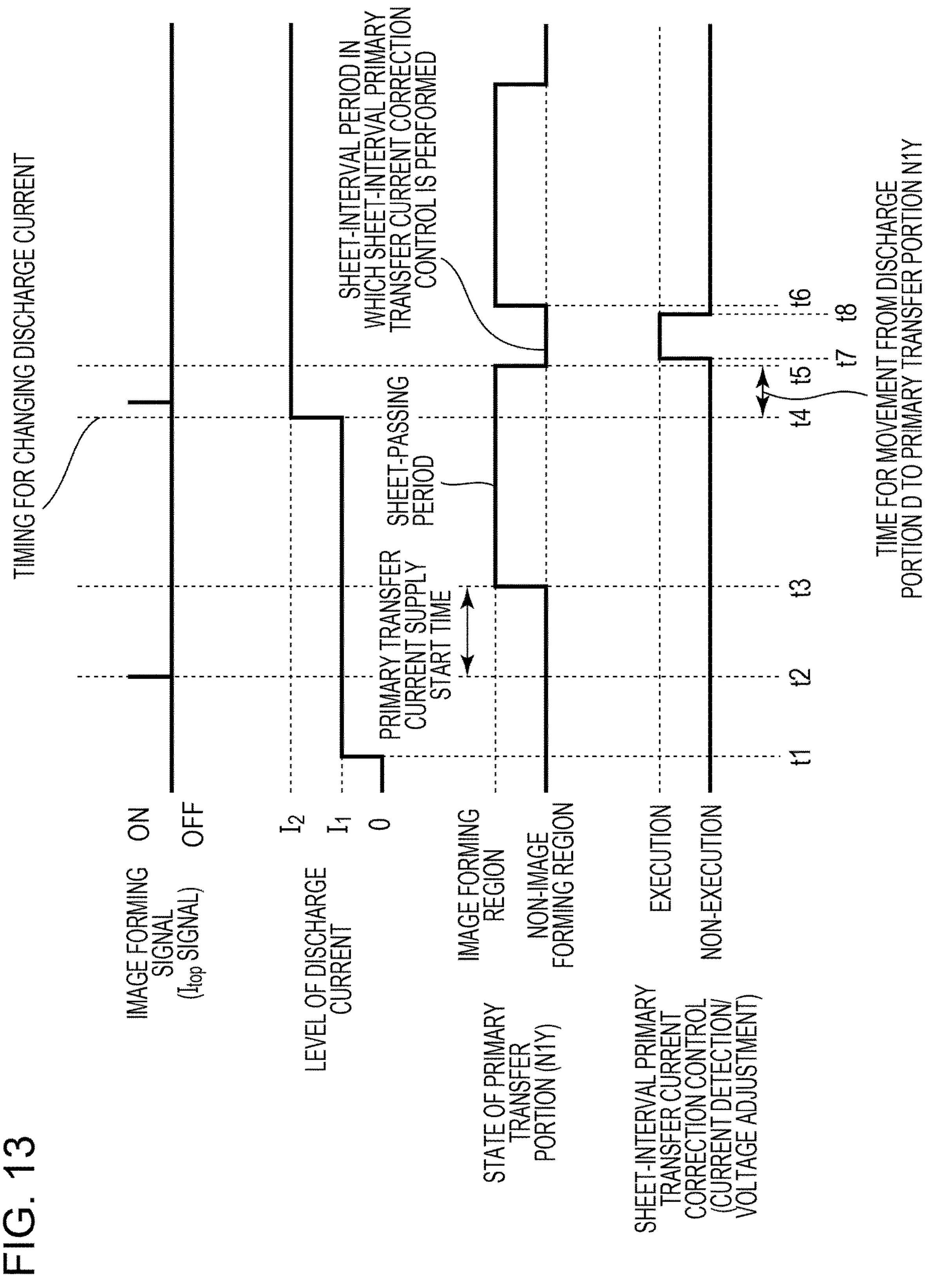
FIG. 13 is a timing chart for explaining a timing for changing the discharge current.

Therefore, the sheet-interval period in which sheet-interval control is performed may be synchronized with the timing for changing the discharge current. In this case, during execution of a print job, the control unit 50 performs control to change the discharge current while the region on the intermediate transfer belt 6, which serves as the sheet-interval region to be subjected to sheet-interval control when passing through the primary transfer portion N1, is passing through the discharge portion D immediately before that. That is, in this case, during execution of a print job, the control unit 50 performs control to change the discharge current at the timing corresponding to the following sheet-interval period in which sheet-interval control is performed. FIG. 13 is a timing chart for explaining the timing for changing the discharge current during execution of a print job in this case. The timing chart of FIG. 13 is substantially the same as the timing chart of FIG. 11 except that the timing for performing sheet-interval control is added.

As illustrated in FIG. 13, after the sheet-passing period (t3 to t5) has elapsed, at the timing for performing sheet-interval control, the supply of the primary transfer current is temporarily stopped, and the above-described sheet-interval control is executed (t7 to t8). At this time, the discharge current is changed while the region on the intermediate transfer belt 6, which passes through the primary transfer portion N1Y in the sheet-interval period from t5 to t6 in which sheet-interval control is performed, is passing through the discharge portion D. That is, the discharge current is changed at the timing (t4) which is earlier by a predetermined time than the timing (t5) at which the region on the intermediate transfer belt 6, which passes through the primary transfer portion N1Y in the sheet-interval period in which sheet-interval control is performed, reaches the primary transfer portion N1Y. It is possible to set t4 to a timing earlier than t5 by a time required for the intermediate transfer belt 6 to move by the length L (FIG. 12) from the discharge portion D to the primary transfer portion N1Y. However, the present disclosure is not limited to this, and, after the region on the intermediate transfer belt 6, which has been at the discharge portion D at t4, has reached the primary transfer portion N1Y, the primary transfer current during sheet-interval control may be detected. Although FIGS. 11 and 12 focus on the most upstream primary transfer portion N1Y, when the same sheet-interval region including the portion where the discharge current is changed sequentially pass from the most upstream primary transfer portion N1Y to the most downstream primary transfer portion N1K in the moving direction of the surface of the intermediate transfer belt 6, sheet-interval control (detecting the primary transfer current and changing the primary transfer voltage) for each of the image forming portions 10Y, 10M, 10C, and 10K is performed.

In this manner, during execution of the print job, by changing the discharge current at the timing corresponding to the following sheet-interval period in which sheet-interval control is performed, the primary transfer current is corrected (the primary transfer voltage is readjusted) in the charged state of the intermediate transfer belt 6 with the changed discharge current. As a result, it is possible to suppress the occurrence of the image density unevenness in which the image density decreases on the recording material P after the sheet-interval region (after the discharge current is changed).

10. Control Procedure

Figure 14:
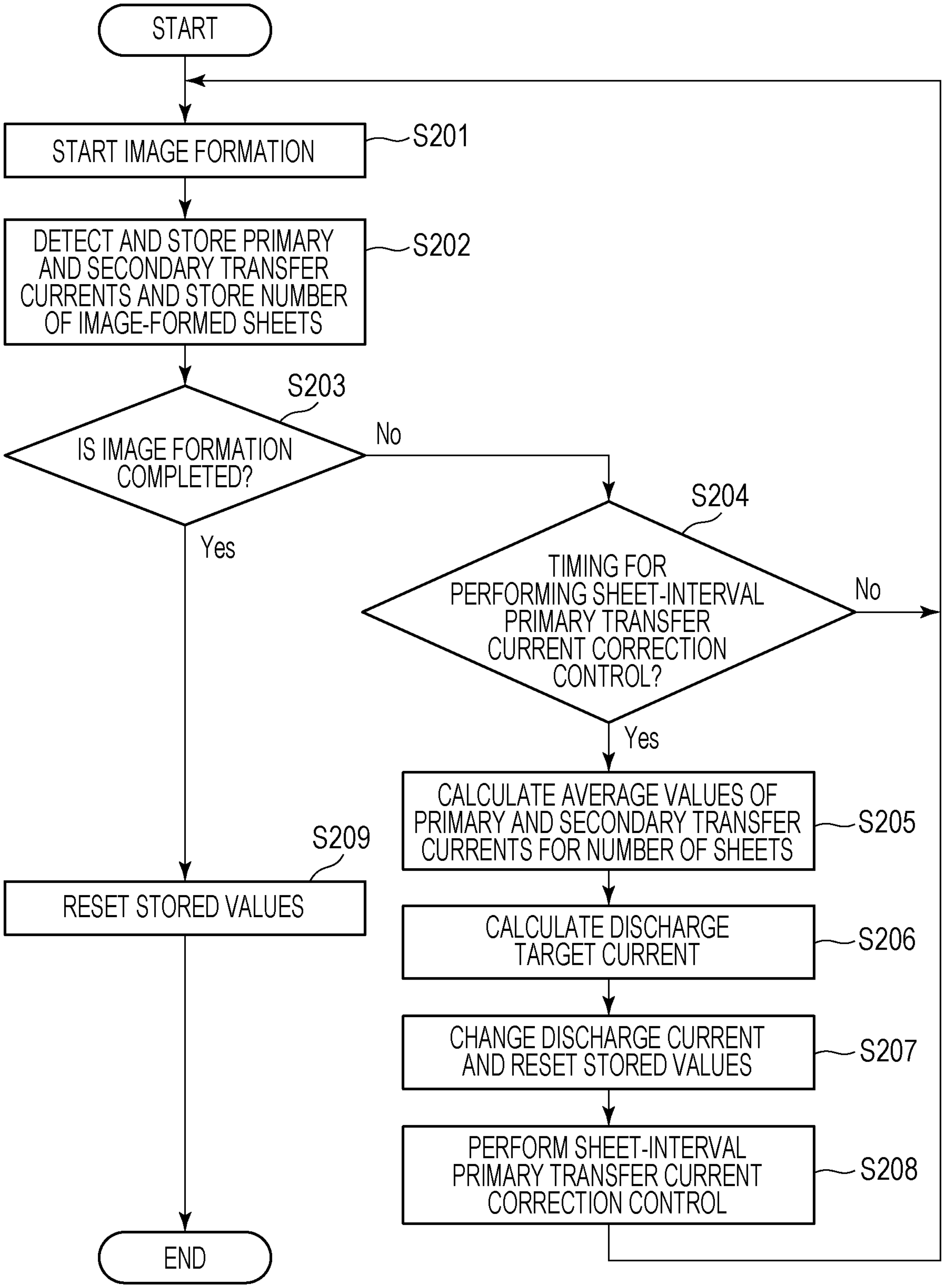
FIG. 14 is a flowchart of control in a first embodiment.

Next, an example of an operation of a print job in this embodiment will be described. FIG. 14 is a flowchart illustrating an outline of an example of a procedure of a print job in this embodiment. In the example of FIG. 14, as described above, an exemplary case will be described in which the sheet-interval period in which sheet-interval control is performed is synchronized with the timing for changing the discharge current.

When a print job is started and image formation is started (S201), the control unit 50 stores, in the RAM 52, detection results of the primary transfer current and the secondary transfer current at the image forming time, and also integrates the number of image-formed sheets and stores the integrated number in the sheet counter 70 (S202). In this embodiment, as the primary transfer current at the image forming time, the control unit 50 stores, in the RAM 52, a detection result of the primary transfer current (average value for each sheet in this embodiment) at the time of the primary transfer for each image transferred onto one sheet of the recording material P (when the image forming region is passing through the primary transfer portion N1). In addition, in this embodiment, as the secondary transfer current at the image forming time, the control unit 50 stores, in the RAM 52, a detection result of the secondary transfer current (average value for each sheet in this embodiment) at the time of the secondary transfer for each image transferred onto one sheet of the recording material P (when the recording material P is passing through the secondary transfer portion N2). Furthermore, every time an image transferred onto one sheet of the recording material P is formed (for example, secondarily transferred), the control unit 50 integrates the number of image-formed sheets and stores the integrated number in the sheet counter 70.

Subsequently, the control unit 50 determines whether all image formation of the print job is completed (S203). If the control unit 50 determines in S203 that the image formation is completed ("Yes"), the process proceeds to S209. If the control unit 50 determines in S203 that the image formation is not completed ("No"), the control unit 50 determines whether it is the timing for performing sheet-interval control (S204). In this embodiment, the control unit 50 determines whether the number of image-formed sheets reaches a predetermined number of image-formed sheets (14 sheets in this embodiment), and if the number of image-formed sheets reaches the predetermined number, the control unit 50 determines that it is the timing for performing sheet-interval control. If the control unit 50 determines in S204 that it is not the timing for performing sheet-interval control ("No"), the process returns to S201. If the control unit 50 determines in S204 that it is the timing for performing sheet-interval control ("Yes"), the control unit 50 averages the primary transfer current and the secondary transfer current for the number of image-formed sheets stored in the RAM 52 (S205). Subsequently, the control unit 50 calculates the target value (target current) of the discharge current by the above-described calculation method (S206). As described above, the control unit 50 calculates the discharge current by the above-described formula (1) using the detection result (average value) of the primary transfer current, the detection result (average value) of the secondary transfer current, and the target values (which may be detection results) of the first and second cleaning currents. In addition, the control unit 50 changes the discharge current to the value calculated this time at the timing corresponding to the sheet-interval period in which sheet-interval control is performed (S207). Furthermore, in S207, the control unit 50 deletes the detection results of the primary transfer current and the secondary transfer current stored in the RAM 52 and also resets the count value of the number of image-formed sheets regarding the timing for performing sheet-interval control stored in the sheet counter 70 to an initial value (zero in this embodiment). Subsequently, the control unit 50 performs sheet-interval control (S208), and the process returns to S201.

In S209, the control unit 50 deletes the detection results of the primary transfer current and the secondary transfer current stored in the RAM 52, resets the count value of the number of image-formed sheets regarding the timing for performing sheet-interval control stored in the sheet counter 70 to an initial value (zero in this embodiment), and the print job ends.

11. Evaluation Test

As an evaluation test for confirming the effect of this embodiment, a sheet-passing durability test was conducted. The test was conducted for each of the following Example 1-1, Example 1-2, Comparative Example 1, and Comparative Example 2. Example 1-1 is a case where the timing for changing the discharge current is set to a timing corresponding to a sheet-interval period in which sheet-interval control is not performed. Example 1-2 is a case where the timing for changing the discharge current is set to a timing corresponding to a sheet-interval period in which sheet-interval control is performed. Comparative Example 1 is a case where the timing for changing the discharge current is set to a timing corresponding to a sheet-passing period. Comparative Example 2 is a case where the discharge current is not changed, and the discharge current during the sheet-passing durability test is substantially constant. In Comparative Example 2, a constant current of 210 μA was continuously applied as the discharge current during the sheet-passing durability test.

The sheet-passing durability test was conducted as follows. Under the respective conditions of the above-described Example 1-1, Example 1-2, Comparative Example 1, and Comparative Example 2, using plain paper of A3 size as the recording material P, continuous image formation of forming a halftone image having a reflection density of 0.6 on the entire surface of the paper was performed.

The results are illustrated in Table 2. In a case where the discharge current was changed at the timing corresponding to the sheet-passing period (Comparative Example 1), the case where the image density unevenness occurred, in which the image density was reduced in the middle of the sheet-passing direction on the same sheet, was evaluated as "Yes", and the case where the image density unevenness did not occur was evaluated as "No". In addition, a case where the discharge current was changed at the timing corresponding to the sheet-interval period (Example 1-1 and Example 1-2), the case where the image density unevenness occurred, in which the image density decreased after the discharge current was changed, was evaluated as "Yes", and the case where the image density unevenness did not occur was evaluated as "No". Furthermore, a red image (secondary color of yellow and magenta) was formed after 10000 sheets were passed, and the case where a mesh-like abnormal image occurred was evaluated as "Yes", and the case where a mesh-like abnormal image did not occur was evaluated as "No". The mesh-like abnormal image is a phenomenon caused by electric discharge, which is generated when the ion-conductive material (particularly, negative ions in this embodiment) of the intermediate transfer belt 6 is unevenly distributed on the base layer **6*a* side of the elastic layer 6*b* and the electric resistance of the intermediate transfer belt 6** increases.

TABLE 2

| | Density unevenness on same sheet | Density unevenness on sheet after changing | Mesh-like image |
|---|---|---|---|
| Example 1-1 | No | Yes (slight) | No |
| Example 1-2 | No | No | No |
| Comparative Example 1 | Yes | No | No |
| Comparative Example 2 | No | No | Yes |

In Comparative Example 1, since the discharge current was changed at the timing corresponding to the sheet-passing period, the sheet passing during the sheet-passing period had the image density unevenness. In addition, in Comparative Example 1, a mesh-like abnormal image due to an increase in the electric resistance of the intermediate transfer belt 6 did not occur. In Comparative Example 2, since the discharge current was not changed during the sheet-passing durability test, the image density unevenness did not occur, but a mesh-like abnormal image due to an increase in the electric resistance of the intermediate transfer belt 6 occurred.

In Example 1-1, the image density unevenness did not occur on the same paper surface, but the image density unevenness occurred between images. However, the image density unevenness between images in Example 1-1 was so slight as not to be conspicuous depending on the image to be printed. In Example 1-2, the image density unevenness did not occur on the same paper surface, and the image density unevenness did not occur between images either. In addition, in Example 1-1 and Example 1-2, a mesh-like abnormal image due to an increase in the electric resistance of the intermediate transfer belt 6 did not occur.

In this manner, in this embodiment, the image forming apparatus 100 includes: the image bearing member 1 that bears a toner image; the rotatable endless intermediate transfer belt 6 onto which the toner image is to be transferred from the image bearing member 1; the primary transfer member 5 that primarily transfers the toner image from the image bearing member 1 onto the intermediate transfer belt 6 by supplying the primary transfer current to the intermediate transfer belt 6 at the primary transfer portion N1; the secondary transfer member 9 that secondarily transfers the toner image from the intermediate transfer belt 6 onto the recording material P by supplying the secondary transfer current to the intermediate transfer belt 6 at the secondary transfer portion N2; the discharge member 271 that supplies the discharge current to the intermediate transfer belt 6 at the discharge portion D downstream of the secondary transfer portion N2 and upstream of the primary transfer portion N1 in the rotation direction of the intermediate transfer belt 6 to control the relationship between the current supplied in the direction (inward direction) from the outer peripheral surface side to the inner peripheral surface side of the intermediate transfer belt 6 and the current supplied in the direction (outward direction) from the inner peripheral surface side to the outer peripheral surface side of the intermediate transfer belt 6; the discharge power source E5 that supplies the discharge current; and the control unit 50 that can control the discharge power source E5. When changing the discharge current during execution of a print job of continuous image formation in which a toner image is continuously transferred onto a plurality of pieces of the recording material P, the control unit 50 controls the discharge power source E5 so as to change the discharge current while the region on the intermediate transfer belt 6, which serves as the image-interval region (sheet-interval region) between the image forming region of the image transferred onto the previous piece of the recording material P and the image forming region of the image transferred onto the following piece of the recording material P when passing through the primary transfer portion N1, is passing through the discharge portion D immediately before passing through the primary transfer portion N1. In this embodiment, the control unit 50 can perform adjustment control (sheet-interval primary transfer current correction control or sheet-interval control) for adjusting the primary transfer voltage applied to the primary transfer member 5 for supplying the primary transfer current while the image-interval region is passing through the primary transfer portion N1 during execution of the print job of continuous image formation, and, when changing the discharge current during execution of the print job of continuous image formation, controls the discharge power source E5 so as to change the discharge current while the region on the intermediate transfer belt 6, which serves as the image-interval region to be subjected to the adjustment control when passing through the primary transfer portion N1, is passing through the discharge portion D immediately before passing through the primary transfer portion N1.

The control unit 50 can perform control to change the discharge current at a timing earlier than the timing at which the region on the intermediate transfer belt 6, which serves as the image-interval region to be subjected to the adjustment control, reaches the primary transfer portion N1 by the time taken for the intermediate transfer belt 6 to move from the discharge portion D to the primary transfer portion N1. However, the control unit 50 may perform control such that, after the region on the intermediate transfer belt 6, which has been at the discharge portion D at the changing of the discharge current, has reached the primary transfer portion N1Y, the primary transfer current during sheet-interval control is detected. In this embodiment, the control unit 50 sets the discharge current such that the current balance approaches zero. The current balance is obtained by subtracting the sum of positive currents, per unit length of the intermediate transfer belt 6 in the width direction in the region where the current is supplied by a current supply member to the intermediate transfer belt 6, the current being supplied by the current supply member in the direction (outward direction) from the inner peripheral surface side to the outer peripheral surface side of the intermediate transfer belt 6 at the image forming time, from the sum of positive currents, per unit length of the intermediate transfer belt 6 in the width direction in the region where the current is supplied by the current supply member, the current being supplied by the current supply member in the direction (inward direction) from the outer peripheral surface side to the inner peripheral surface side of the intermediate transfer belt 6 at the image forming time. In this embodiment, the image forming apparatus 100 includes the detecting units F1 and F2 that monitor the current balance, and the control unit 50 sets the discharge current on the basis of detection results of the detecting units F1 and F2. In this embodiment, the detecting units F1 and F2 detect at least the primary transfer current and the secondary transfer current. In this embodiment, the image forming apparatus 100 includes the cleaning members 122 and 123 that remove the toner from the intermediate transfer belt 6 by the cleaning currents being supplied to the intermediate transfer belt 6 at the cleaning portions CL1 and CL2 downstream of the secondary transfer portion N2 and upstream of the primary transfer portion N1 in the rotation direction of the intermediate transfer belt 6. In addition, in this embodiment, the discharge portion D is positioned downstream of the cleaning portions CL1 and CL2 and upstream of the primary transfer portion N1 in the rotation direction of the intermediate transfer belt 6. In this embodiment, the intermediate transfer belt 6 has ion conductivity. In particular, in this embodiment, the intermediate transfer belt 6 includes the elastic layer 6*b* containing the ion-conductive material.

As described above, according to this embodiment, it is possible to suppress the occurrence of the image density unevenness caused by changing the discharge current during execution of a print job, while suppressing the occurrence of an image defect caused by an increase in the electric resistance of the intermediate transfer belt 6.

Second Embodiment

Next, another embodiment of the present disclosure will be described. The basic configuration and operation of an image forming apparatus in this embodiment are the same as those of the image forming apparatus in the first embodiment. Therefore, in the image forming apparatus of this embodiment, elements having the same or corresponding functions or configurations as those of the image forming apparatus of the first embodiment are represented by the same reference numerals as those in the first embodiment and will be omitted from detailed description.

1. Outline of Embodiment

In this embodiment, if the change amount for changing the discharge current during execution of a print job is greater than or equal to a predetermined value, the sheet-interval period in which sheet-interval control is performed and the timing for changing the discharge current are synchronized with each other. On the other hand, in this embodiment, in a case where the change amount when the discharge current is changed during execution of a print job is less than the above-described predetermined value, the discharge current is changed at a timing corresponding to a given sheet-interval period (for example, every image-formed sheet).

This is because, in a case where the change amount of the discharge current is small, the image density unevenness between pieces of the recording material P with the sheet-interval region interposed therebetween may be negligible, and therefore, in such a case, priority is given to setting of a more appropriate discharge current in order to suppress an increase in the electric resistance of the intermediate transfer belt 6. In this embodiment, the predetermined value of the change amount of the discharge current is set to 10 μA, but is not limited to this value. The image density unevenness between pieces of the recording material P with the sheet-interval region interposed therebetween needs to be at least sufficiently inconspicuous.

2. Control Procedure

Figure 15:
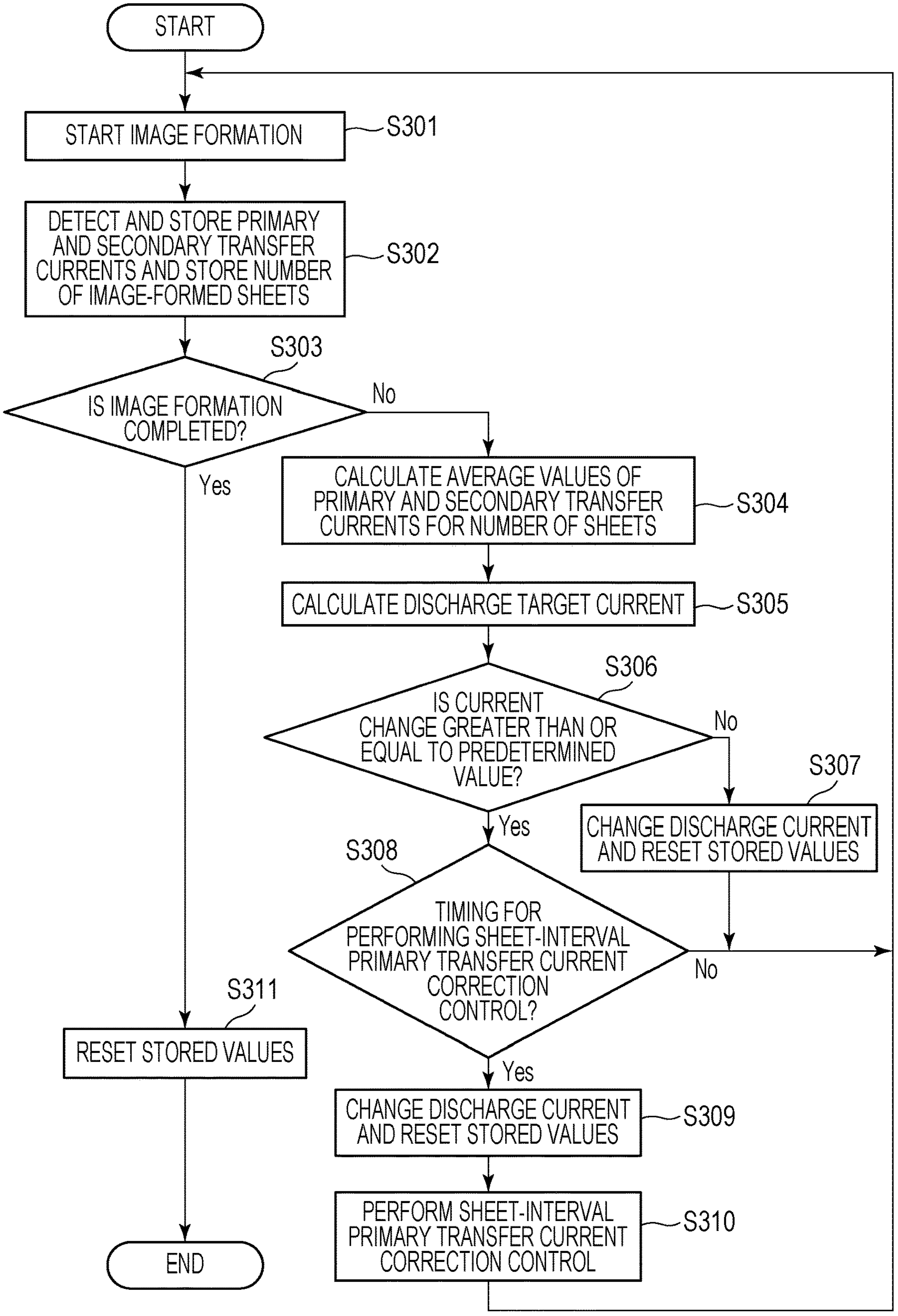
FIG. 15 is a flowchart of control in a second embodiment.

Next, an example of an operation of a print job in this embodiment will be described. FIG. 15 is a flowchart illustrating an outline of an example of a procedure of a print job in this embodiment.

When a print job is started and image formation is started (S301), the control unit 50 stores the detection results of the primary transfer current and the secondary transfer current at the image forming time in the RAM 52, and also integrates the number of image-formed sheets and stores the integrated number in the sheet counter 70 (S302). In this embodiment, as in the first embodiment, as the primary transfer current at the image forming time, the control unit 50 stores, in the RAM 52, the detection result (average value) of the primary transfer current at the primary transfer for each image transferred onto one sheet of the recording material P. In addition, in this embodiment, as the secondary transfer current at the image forming time, the control unit 50 stores, in the RAM 52, the detection result (average value) of the secondary transfer current at the secondary transfer for each image transferred onto one sheet of the recording material P. Furthermore, every time an image transferred onto one sheet of the recording material P is formed (for example, secondarily transferred), the control unit 50 integrates the number of image-formed sheets and stores the integrated number in the sheet counter 70.

Subsequently, the control unit 50 determines whether all image formation of the print job is completed (S303). If the control unit 50 determines in S303 that the image formation is completed ("Yes"), the process proceeds to S311. If the control unit 50 determines in S303 that the image formation is not completed ("No"), the control unit 50 averages the primary transfer current and the secondary transfer current for the number of image-formed sheets stored in the RAM 52 (S304). Subsequently, the control unit 50 calculates the target value (target current) of the discharge current by the calculation method described in the first embodiment (S305). As described in the first embodiment, the control unit 50 calculates the discharge current by the above-described formula (1) using the detection result (average value) of the primary transfer current, the detection result (average value) of the secondary transfer current, and the target values (which may be detection results) of the first and second cleaning currents.

Subsequently, the control unit 50 determines whether the difference between the target value of the discharge current used so far and the target value of the discharge current calculated this time, that is, a change (change amount) between the discharge current before changing and the discharge current after changing, is greater than or equal to a predetermined value (10 μA in this embodiment) (S306). Subsequently, if the control unit 50 determines in S306 that the change amount of the discharge current is less than the predetermined value ("No"), the control unit 50 changes the discharge current to the value calculated this time at the timing corresponding to the sheet-interval period in which sheet-interval control described in the first embodiment is not performed (S307), and the process returns to S301. In S307, the control unit 50 deletes the detection results of the primary transfer current and the secondary transfer current stored in the RAM 52. If the control unit 50 determines in S306 that the change amount of the discharge current is greater than or equal to the predetermined value ("Yes"), the control unit 50 determines whether it is the timing for performing sheet-interval control (S308). In this embodiment, the control unit 50 determines whether the number of image-formed sheets reaches a predetermined number of image-formed sheets (14 sheets in this embodiment), and if the number of image-formed sheets reaches the predetermined number, the control unit 50 determines that it is the timing for performing sheet-interval control. If the control unit 50 determines in S308 that it is not the timing for performing sheet-interval control ("No"), the process returns to S301. If the control unit 50 determines in S308 that it is the timing for performing sheet-interval control ("Yes"), the control unit 50 changes the discharge current to the value calculated this time at the timing corresponding to the sheet-interval period in which sheet-interval control described in the first embodiment is performed (S309).

Furthermore, in S309, the control unit 50 deletes the detection results of the primary transfer current and the secondary transfer current stored in the RAM 52 and also resets the count value of the number of image-formed sheets regarding the timing for performing sheet-interval control stored in the sheet counter 70 to an initial value (zero in this embodiment). Subsequently, the control unit 50 performs sheet-interval control (S310), and the process returns to S301.

In S311, the control unit 50 deletes the detection results of the primary transfer current and the secondary transfer current stored in the RAM 52, resets the count value of the number of image-formed sheets regarding the timing for performing sheet-interval control stored in the sheet counter 70 to an initial value (zero in this embodiment), and the print job ends.

In this manner, in this embodiment, only if the change amount of the discharge current is greater than or equal to the predetermined value, the sheet-interval period in which sheet-interval control is performed and the timing for changing the discharge current are synchronized with each other. Therefore, if the change amount of the discharge current is small, the discharge current can be corrected at a timing corresponding to a given sheet-interval period (for example, every image-formed sheet). Accordingly, an increase in the electric resistance of the intermediate transfer belt 6 can be further suppressed.

3. Evaluation Test

As an evaluation test for confirming the effect of this embodiment, a sheet-passing durability test was conducted. The test was conducted for this embodiment (Example 2) and the above-described Example 1-2 (the timing for changing the discharge current is set to a timing corresponding to a sheet-interval period in which sheet-interval control is performed).

The sheet-passing durability test was conducted as follows. As the recording material P, 20000 sheets of paper (plain paper of A3 size) left at a temperature-humidity of 30°

C./80% for half a day and 80000 sheets of paper (plain paper of A3 size) left in an environment of 20° C./5% for half a day were prepared. Then, these sheets of paper were superposed at random, and continuous image formation of forming an image of 70% Duty (image ratio) on the entire surface of the paper was performed. To make the secondary transfer current uneven, the number of sheets of paper left in different environments was made to have an uneven ratio.

The results are illustrated in Table 3. A red image (secondary color of yellow and magenta) was formed after all the sheets were passed, and the case where a mesh-like abnormal image occurred was evaluated as "Yes", and the case where a mesh-like abnormal image did not occur was evaluated as "No".

TABLE 3

| | Example 1 | Example 2 |
|---|---|---|
| Mesh-like abnormal image | Yes (slight) | No |

In the case of Example 1-2, a mesh-like abnormal image occurred. However, the degree of occurrence of the mesh-like abnormal image in Example 1-2 was so slight that there was no issue in practical use. In the case of Example 2, the change amount of the discharge current was less than the predetermined value (10 μA in this embodiment), and therefore, the discharge current was corrected for each image-formed sheet. Accordingly, an increase in the volume resistivity of the intermediate transfer belt 6 was suppressed to be as low as $1.6\times10^{11}$ Ω·cm, and no mesh-like abnormal image occurred. In the configuration of this embodiment, for example, from the viewpoint of the image quality (suppressing a mesh-like abnormal image and maintaining sufficient transferability), an allowable upper limit value of the volume resistivity of the intermediate transfer belt 6 is about $1\times10^{12}$ Ω·cm. In addition, in both of Example 1 and Example 2, no image defects due to the image density unevenness occurred.

In this manner, in this embodiment, when changing the discharge current during execution of a print job of continuous image formation, if the change amount of the discharge current is greater than or equal to the predetermined value, the control unit 50 controls the discharge power source E5 so as to change the discharge current while the region on the intermediate transfer belt 6, which serves as the image-interval region (sheet-interval region) to be subjected to the adjustment control (sheet-interval primary transfer current correction control or sheet-interval control) when passing through the primary transfer portion N1, is passing through the discharge portion D immediately before passing through the primary transfer portion N1.

As described above, according to this embodiment, substantially the same effect as that in the first embodiment can be obtained, and the increase in the electric resistance of the intermediate transfer belt 6 can be further suppressed.

Miscellaneous

Although the present disclosure has been described above with reference to specific embodiments, the present disclosure is not limited to the above-described embodiments.

For example, the discharge member is not limited to the brush roller, and may be other forms such as a solid rubber roller, a sponge rubber roller, a metal roller, a sheet, a film, and a pad. The same applies to the primary transfer member, the secondary transfer member, and the cleaning member.

In addition, the control of the discharge voltage is not limited to constant current control. The target value of the discharge current may be set as in the above-described embodiments, a voltage value when the current of the target value flows may be obtained, and the discharge voltage may be subjected to constant voltage control so as to be substantially constant at the voltage value. The same applies to the cleaning voltage, and the control of the cleaning voltage is not limited to constant current control and may be constant voltage control. Similarly, the control of the primary transfer voltage and the secondary transfer voltage is not limited to constant voltage control, and at least one of the primary transfer voltage and the secondary transfer voltage may be subjected to constant current control. In a case where the primary transfer voltage and the secondary transfer voltage are subjected to constant current control, these target values may be used for obtaining the discharge current.

According to the present disclosure, it is possible to suppress the occurrence of the image density unevenness caused by changing the discharge current during execution of a print job.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may include one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read-only memory (ROM), a storage of distributed computing systems, an optical disk (such as a compact disc (CD), digital versatile disc (DVD), or Blu-ray Disc™ (BD)), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-102273, filed Jun. 24, 2022, which is hereby incorporated by reference herein in its entirety.

What is claimed is:

1. An image forming apparatus comprising:

an image bearing member configured to bear a toner image;

an intermediate transfer belt that is rotatable, endless, and onto which the toner image is to be transferred from the image bearing member;

a primary transfer member configured to primarily transfer the toner image from the image bearing member onto the intermediate transfer belt by supplying a primary transfer current to the intermediate transfer belt at a primary transfer portion;

a first power source configured to apply a voltage to the primary transfer member;

a first detecting unit configured to detect a current supplied from the first power source;

a secondary transfer member configured to secondarily transfer the toner image from the intermediate transfer belt onto a recording material by supplying a secondary transfer current to the intermediate transfer belt at a secondary transfer portion;

a second power source configured to apply a voltage to the secondary transfer member;

a second detecting unit configured to detect a current supplied from the second power source;

a discharge member configured to supply a discharge current to the intermediate transfer belt at a discharge portion downstream of the secondary transfer portion and upstream of the primary transfer portion in a rotation direction of the intermediate transfer belt;

a third power source configured to supply the discharge current; and a control unit configured to control the third power source, wherein, during execution of a print job of continuous image formation in which the toner image is continuously transferred onto a first recording material and a second recording material following the first recording material, the control unit controls the third power source such that the discharge current is subjected to constant current control based on a detection result detected by the first detecting unit during the print job and a detection result detected by the second detecting unit during the print job, and wherein, when changing the discharge current from a first discharge current to a second discharge current, the control unit controls the third power source such that, after an image forming region of a first image to be transferred onto the first recording material passes through the primary transfer portion, a trailing edge of a first discharge current supply region on the intermediate transfer belt, to which the first discharge current is supplied, initially passes through the primary transfer portion, and also controls the third power source such that, before an image forming region of a second image to be transferred onto the second recording material passes through the primary transfer portion, a leading edge of a second discharge current supply region on the intermediate transfer belt, to which the second discharge current is supplied, initially passes through the primary transfer portion.

2. The image forming apparatus according to claim 1, wherein the control unit is capable of performing adjustment control for adjusting a primary transfer voltage applied to the primary transfer member during execution of the print job, and wherein, when changing the discharge current from the first discharge current to the second discharge current, the control unit performs the adjustment control while an image-interval region corresponding to a region between the first recording material and the second recording material is passing through the primary transfer portion.

3. The image forming apparatus according to claim 2, wherein the control unit performs the adjustment control after the second discharge current supply region passes through the primary transfer portion.

4. The image forming apparatus according to claim 1, wherein, in a width direction of the intermediate transfer belt, a length of a first contact portion where the primary transfer member and the intermediate transfer belt are in contact with each other is a first length, and a length of a second contact portion where the secondary transfer member and the intermediate transfer belt are in contact with each other is a second length, and wherein the control unit controls the third power source based on a first current density and a second current density, where the first current density is obtained by dividing, by the first length, the detection result detected by the first detecting unit during the print job, and the second current density is obtained by dividing, by the second length, the detection result detected by the second detecting unit during the print job.

5. The image forming apparatus according to claim 1, further comprising:

a first electrostatic cleaning member disposed downstream of the secondary transfer portion and upstream of the discharge member in the rotation direction of the intermediate transfer belt; and a second electrostatic cleaning member disposed downstream of the secondary transfer portion and upstream of the discharge member in the rotation direction of the intermediate transfer belt, wherein the first electrostatic cleaning member is configured to electrostatically clean the intermediate transfer belt and the second electrostatic cleaning member is configured to electrostatically clean the intermediate transfer belt.

6. The image forming apparatus according to claim 1, wherein the intermediate transfer belt includes an elastic layer containing an ion-conductive material.

7. The image forming apparatus according to claim 1, wherein the control unit controls the third power source such that the image forming region of the second image passes through the primary transfer portion while the second discharge current supply region is passing through the primary transfer portion.

8. An image forming apparatus comprising:

an image bearing member configured to bear a toner image;

an intermediate transfer belt that is rotatable, endless, and onto which the toner image is to be transferred from the image bearing member;

a primary transfer member configured to primarily transfer the toner image from the image bearing member onto the intermediate transfer belt by supplying a primary transfer current to the intermediate transfer belt at a primary transfer portion;

a first power source configured to apply a voltage to the primary transfer member;

a first detecting unit configured to detect a current supplied from the first power source;

a secondary transfer member configured to secondarily transfer the toner image from the intermediate transfer belt onto a recording material by supplying a secondary transfer current to the intermediate transfer belt at a secondary transfer portion;

a second power source configured to apply a voltage to the secondary transfer member;

a second detecting unit configured to detect a current supplied from the second power source;

a discharge member configured to supply a discharge current to the intermediate transfer belt at a discharge portion downstream of the secondary transfer portion and upstream of the primary transfer portion in a rotation direction of the intermediate transfer belt;

a third power source configured to supply the discharge current;

a third detecting unit configured to detect the discharge current supplied from the third power source; and a control unit configured to control the first power source, the second power source, and the third power source, wherein, during execution of a print job of continuous image formation in which the toner image is continuously transferred onto a first recording material and a second recording material following the first recording material, the control unit controls the first power source and the second power source such that the voltages applied by the first and second power sources are subjected to constant voltage control, and also controls the third power source such that the discharge current is subjected to constant current control based on a detection result detected by the first detecting unit during the print job and a detection result detected by the second detecting unit during the print job, and wherein, in a width direction of the intermediate transfer belt, a length of a first contact portion where the primary transfer member and the intermediate transfer belt are in contact with each other is a first length, a length of a second contact portion where the secondary transfer member and the intermediate transfer belt are in contact with each other is a second length, and the control unit controls the third power source based on a first current density and a second current density, where the first current density is obtained by dividing, by the first length, the detection result detected by the first detecting unit during the print job, and the second current density is obtained by dividing, by the second length, the detection result detected by the second detecting unit during the print job.

* * * * *